US012752275B2

(12) United States Patent
Zawatsky et al.

(10) Patent No.: US 12,752,275 B2
(45) Date of Patent: Oct. 6, 2026

(54) PRESSURE-STEPPED CHEMICAL REACTIONS AND ASSOCIATED METHODS, SYSTEMS, APPARATUSES, AND ARTICLES

(71) Applicant: CEM Corporation, Matthews, NC (US)

(72) Inventors: Timothy Adam Zawatsky, Matthews, NC (US); Steven Francis Guilmette, Harrisburg, NC (US); William Edward Jennings, Wingate, NC (US); Ian Stuart Goldstein, Matthews, NC (US)

(73) Assignee: CEM Corporation, Matthews, NC (US)

( * ) Notice: Subject to any disclaimer, the term of this patent is extended or adjusted under 35 U.S.C. 154(b) by 917 days.

(21) Appl. No.: 17/838,711

(22) Filed: Jun. 13, 2022

(65) Prior Publication Data

US 2023/0398542 A1 Dec. 14, 2023

(51) Int. Cl.

*B01L 3/00* (2006.01)
*B01L 7/00* (2006.01)
*B01L 9/00* (2006.01)

(52) U.S. Cl.

CPC ............. *B01L 3/50825* (2013.01); *B01L 7/00* (2013.01); *B01L 9/50* (2013.01);
(Continued)

(58) Field of Classification Search

CPC .......... B01L 3/50825; B01L 7/00; B01L 9/50; B01L 2200/0684; B01L 2200/0689;
(Continued)

(56) References Cited

U.S. PATENT DOCUMENTS

| | | | |
|---|---|---|---|
| D208,907 S | 10/1967 | Colister | |
| D210,316 S | 2/1968 | Wolski | |

(Continued)

FOREIGN PATENT DOCUMENTS

| | | |
|---|---|---|
| EP | 0198675 A2 | 10/1986 |
| EP | 1635883 A1 | 3/2006 |

(Continued)

OTHER PUBLICATIONS

Duran Electrode Holder Cap: GL45 Labware Screw Closure Size, PBT, PTFE/Silicone, Open Top. Online, published date unknown. Retrieved on Sep. 21, 2023 from URL: https://www.grainger.com/product/786DY3?gucid=N:N:PS:Paid:GGL:CSM-2295:4P7A1P:20501231&gclid=EAIalQobChMInePUjOW8gQMV-CitBh2zrAFREAQYBSABEgKlmPD_BwE&gclsrc=aw.

(Continued)

*Primary Examiner* — Charles Capozzi
*Assistant Examiner* — Michael Stanley Gzybowski
(74) *Attorney, Agent, or Firm* — Additon, Pendleton & Witherspoon, P.A.

(57) ABSTRACT

In an acid digestion reaction performed in a vessel, an elastic lid or septum can be mounted to the mouth of the vessel with a flanged band. In response to determining that a predetermined pressure has been reached in the vessel, a closing force being applied to the lid or septum can be reduced to initiate venting from the vessel. One or more parameters, including the closing force, can be monitored during the venting, and the closing force can be responsively adjusted to optimize the venting. The closing force can be provided by a clamping apparatus that may or may not include a hydraulic system. The clamping apparatus can be configured to increase the closing force in response to increased hydraulic pressure in the hydraulic system. The clamping apparatus can include an engager having an upwardly extending recess (Continued)

extending at least partially around a downwardly protruding portion of the engager.

27 Claims, 20 Drawing Sheets

(52) U.S. Cl.
CPC .................. *B01L 2200/0684* (2013.01); *B01L 2200/0689* (2013.01); *B01L 2300/048* (2013.01); *B01L 2300/123* (2013.01); *B01L 2300/14* (2013.01); *B01L 2300/18* (2013.01)

(58) Field of Classification Search
CPC ......... B01L 2300/048; B01L 2300/123; B01L 2300/14; B01L 2300/18; B01L 2200/146; B01L 2200/147; B01L 2300/045; B01L 2300/0832; B01L 2300/1866; B01J 19/126; B01J 2219/1215; B01J 2219/1233; B01J 2219/1236; B01J 2219/1245; H05B 6/806; B65D 51/002; G01N 1/44
See application file for complete search history.

(56) References Cited

U.S. PATENT DOCUMENTS

| | | | | |
|---|---|---|---|---|
| 4,004,122 | A | 1/1977 | Hallier | |
| D301,550 | S | 6/1989 | Mobberley | |
| 4,861,556 | A | 8/1989 | Neas et al. | |
| 4,946,797 | A | 8/1990 | Neas et al. | |
| 5,204,065 | A | 4/1993 | Floyd | |
| 5,230,865 | A | 7/1993 | Hargett et al. | |
| 5,264,185 | A | 11/1993 | Floyd | |
| 5,420,039 | A | 5/1995 | Renoe et al. | |
| 5,620,659 | A | 4/1997 | Revesz | |
| D380,385 | S | 7/1997 | Litke | |
| 5,948,307 | A | 9/1999 | Stalling | |
| D422,357 | S | 4/2000 | Niedospial, Jr. | |
| 6,287,526 | B1 | 9/2001 | Hargett, Jr. | |
| D452,151 | S | 12/2001 | Scott | |
| 7,285,423 | B2 * | 10/2007 | Ulin | G01N 1/44 73/1.73 |
| D679,592 | S | 4/2013 | Stull | |
| 9,237,608 | B2 | 1/2016 | Barclay et al. | |
| D775,726 | S | 1/2017 | Giancursio, II | |
| D813,981 | S | 3/2018 | Krombein | |
| 9,943,823 | B2 | 4/2018 | Barclay et al. | |
| 10,067,043 | B2 | 9/2018 | Barclay et al. | |
| 10,527,530 | B2 | 1/2020 | Barclay et al. | |
| D963,477 | S | 9/2022 | Torres | |
| D972,932 | S | 12/2022 | Borg | |
| D996,967 | S | 8/2023 | Murali | |
| 2002/0102738 | A1 | 8/2002 | Jennings et al. | |
| 2006/0147352 | A1 | 7/2006 | Ulin et al. | |
| 2007/0140919 | A1 | 6/2007 | Clarkson et al. | |
| 2010/0126997 | A1 | 5/2010 | Stull, Sr. et al. | |
| 2011/0000872 | A1 | 1/2011 | Aneas | |
| 2011/0036705 | A1 | 2/2011 | Barclay et al. | |
| 2011/0068106 | A1 | 3/2011 | Zukor et al. | |
| 2014/0034646 | A1 | 2/2014 | Lanier | |

FOREIGN PATENT DOCUMENTS

| | | | | |
|---|---|---|---|---|
| EP | 2511190 A1 | | 10/2012 | |
| ES | 2739685 T3 | * | 2/2020 | G01N 35/04 |
| WO | 2012/152796 A1 | | 11/2012 | |

OTHER PUBLICATIONS

Microwave Digestion System, Blade. Online, Oct. 19, 2022, Retrieved on Sep. 21, 2023 from URL: https://www.youtube.com/watch?v=YftzNClozGk.

Partial European Search Report in counterpart European Application No. 23174973.0 dated Nov. 6, 2023, pp. 1-15.

Extended European Search Report in commonly owned European Application No. 23174973.0 dated Feb. 21, 2024, pp. 1-22.

* cited by examiner

PRESSURE-STEPPED CHEMICAL REACTIONS AND ASSOCIATED METHODS, SYSTEMS, APPARATUSES, AND ARTICLES

BACKGROUND

Digestion reactions facilitated with laboratory equipment are typically carried out at elevated temperatures and elevated pressures. Such a digestion reaction can be the reaction of a sample with an aggressive acid at high temperatures and pressures. The combination of high temperature and the strong acid tends to break most, and often all, of the chemical bonds in the sample to produce a liquid containing the constituent species, typically elements, of the sample. The liquid can then be analysed for the presence and amounts of these elements.

Microwave systems are often used to accelerate the digestion reaction process. Microwaves typically interact directly with the digestion acid and sample composition so that the digestion can be carried out more quickly than digestion using conventional heat sources.

Although digestion can be carried out using several different acids (e.g., sulfuric, nitric, phosphoric, hydrochloric, hydrofluoric, perchloric, etc.), nitric acid offers advantages in some circumstances. In particular, nitric acid typically avoids forming insoluble compounds with many inorganic samples. Other acids (e.g., sulfuric and hydrochloric) are more likely to form such insoluble compounds during digestion reactions. Thus, nitric acid is often used for digestion because it produces a higher quality sample for analytical testing.

In order to digest in nitric acid, some samples need to be heated above the atmospheric boiling point of the acid. At typical atmospheric pressure, nitric acid (e.g., a typical nitric acid solution) boils at about 120° C., but many samples do not digest completely unless heated to at least about 200° C., and some samples require temperatures of 270-300° C. Thus, in order to reach higher temperatures, nitric acid digestion is often carried out in a pressurized environment, typically using reaction vessels that can withstand pressures of several hundred pounds per square inch.

In order to prevent catastrophic failure at such pressures, a digestion vessel can include, or be associated with, a pressure release mechanism. It is known for such a pressure release mechanism to periodically release pressure by venting a head space of the vessel during the digestion. When releasing pressure, it is typically desirable for only gas in a head space of the vessel to be vented in a manner which does not discharge any of the analyte. However, a rapid pressure drop in the vessel during venting can cause some of the analyte to be disadvantageously spewed from the vessel and/or there may be other disadvantages.

SUMMARY

An aspect of this disclosure is the provision of a closure (e.g., lid, cap, cap assembly, septum, and/or the like) configured to be releasably mounted to a mouth of a reaction vessel for obstructing an opening defined by the mouth, wherein the closure can be used in providing both closed and venting configurations of the vessel, and the closure can be configured and operated in a manner that seeks to ensure that only gas from a head space of the vessel is vented during the venting configurations (e.g., typically without discharging analyte from the vessel), as discussed further below. The closure can be or include a lid (e.g., elastic septum).

The closure may, optionally, further include a band or other suitable structure configured to releasably mount the lid to the vessel. The band can include a body extending at least partially around and defining a hole, and a plurality of latches (e.g., at least two latches) extending downwardly from the body and configured to be elastically deformed and releasably engaged to a predetermined portion of (e.g., a flange of) the vessel to releasably mount the band and lid to the vessel. The plurality of latches can be configured to collectively extend at least partially around the vessel. In an example (e.g., optionally), gas being vented outwardly from the vessel can pass through one or more openings respectively defined between adjacent latches.

Another aspect of this disclosure is the provision of a method for controlling pressure and preserving analytes in an acid digestion reaction performed at elevated temperatures and pressures. The method can include providing a sealed closed configuration of a reaction vessel while the reaction vessel contains reactants comprising acid and a sample. The providing of the sealed closed configuration can include increasing a closing (e.g., clamping) force that holds an obstruction (e.g., the lid or elastic septum) against a mouth of the reaction vessel, and ceasing the increasing of the closing force in response to determining from at least one signal that the closing force has reached a predetermined closing force. The reactants in the reaction vessel can be heated (e.g., by way of microwaves) during the sealed closed configuration, so that pressure within the reaction vessel increases. In response to determining that a predetermined pressure has been reached in the reaction vessel, the closing force can be reduced to initiate outward venting from the reaction vessel. During the venting, the pressure in the reaction vessel can be monitored, and the closing force can be adjusted in a manner that seeks to ensure that only gas from a head space of the reaction vessel is vented (e.g., typically without discharging any of the analyte from the reaction vessel), A further aspect of this disclosure is the provision of a system for performing a digestion reaction. The system can include a support configured to support a reaction vessel; a clamping apparatus configured to apply a closing force toward a mouth of the reaction vessel while the reaction vessel is supported by the support; a heating apparatus configured to heat contents of the reaction vessel (e.g., by way of microwaves) while the reaction vessel is supported by the support; a first sensor configured to provide a signal indicative of gas pressure in a headspace of the reaction vessel while the reaction vessel is supported by the support; a second sensor configured to provide a signal indicative of the closing force; and a computer configured to control, by way of the clamping apparatus, in response to inputs, the closing force and outward venting from an opening of the reaction vessel while the reaction vessel is supported by the support. The inputs can include one or more of the signal from the first sensor and the signal from the second sensor.

As one example, the clamping apparatus can include a hydraulic system and an actuator (e.g., motor) configured to be operated to increase hydraulic pressure in the hydraulic system. The clamping apparatus can be configured to increase the closing force in response to increased hydraulic pressure in the hydraulic system. Alternatively, the hydraulic features may be omitted from the clamping apparatus.

The clamping apparatus can include an engager, and the clamping apparatus can be configured to clamp at least a portion of the closure (e.g., elastic septum) between a lower side of the engager and the mouth of the reaction vessel. The lower side of the engager can include an upwardly extending recess extending at least partially around a downwardly protruding portion of the engager. The upwardly extending recess can be configured to accommodate upward movement of a portion of the closure in a manner that seeks to enhance accuracy of signals from the first sensor.

In accordance with another aspect of this disclosure, the support configured to support the reaction vessel can include a frustoconical surface configured to engage a corresponding frustoconical exterior surface of the reaction vessel.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings are provided as examples. The present invention may be embodied in many different forms and should not be construed as limited to the examples depicted in the drawings.

DETAILED DESCRIPTION

Examples of embodiments are disclosed in the following. The drawings depict an example of an embodiment. Stated differently, an example of an embodiment is described with reference to the drawings. The present invention may, however, be embodied in many different forms and should not be construed as limited to the embodiments set forth herein. For example, features disclosed as part of one embodiment or example can be used in the context of another embodiment or example to yield a further embodiment or example. As another example of the breadth of this disclosure, it is within the scope of this disclosure for one or more of the terms "substantially," "about," "approximately," and/or the like, to qualify each of the adjectives and adverbs of the Detailed Description section of disclosure, as discussed in greater detail below.

Figure 1:
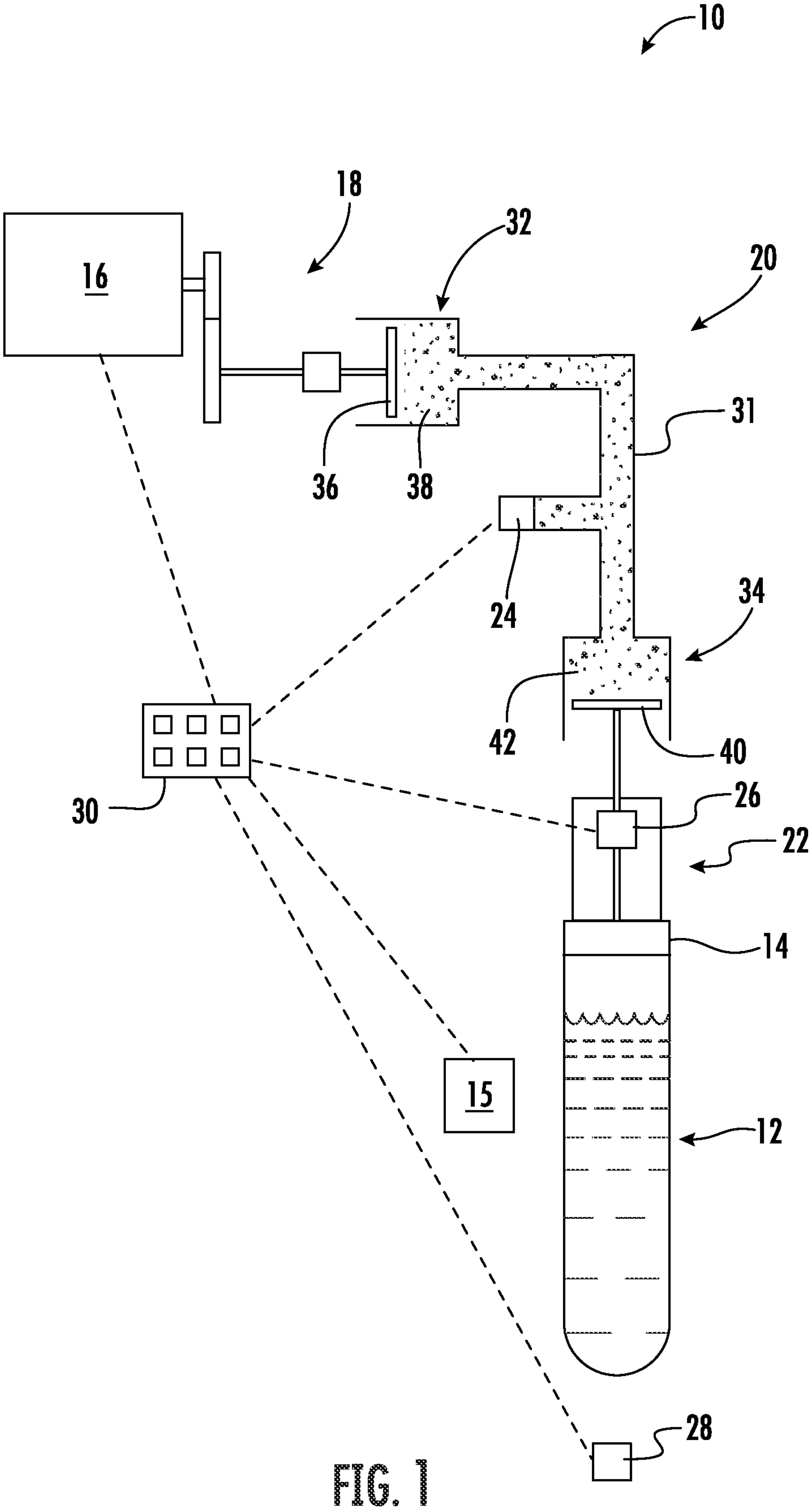
FIG. 1 is a high-level diagram of a system that can be used to facilitate pressure-stepped digestion reactions, in accordance with an embodiment of this disclosure.

FIG. 1 schematically depicts a system 10 configured to facilitate, for example, pressure-stepped chemical reactions (e.g., digestion reactions), in accordance with an embodiment of this disclosure. The system 10 is first described below at a high level, and more detailed descriptions follow the initial overview.

In the example depicted in FIG. 1, the system 10 includes a reaction vessel 12 configured to contain a chemical reaction, and a pressure responsive obstruction or closure 14 (e.g., cap assembly) obstructing an upper opening of the reaction vessel. The closure 14 can be removably mounted to the reaction vessel 12, and can be operative to, for example, both fully close the reaction vessel (e.g., clamped or closed configuration) and partially open the reaction vessel (e.g., vented configuration), as discussed further below. Operation of the closure 14, for transitioning between the closed and vented configurations, can be controlled by a closing or clamping apparatus configured to provide varied force (e.g., closing, clamping, or sealing forces) between the closure 14 and the reaction vessel 12. In the depicted embodiment, the system 10 is configured so that (i) the closing (e.g., clamping) forces and one or more other factors (e.g., heating of contents of the vessel 12) can be controlled in a predetermined manner to at least partially provide a pressure-stepped chemical reaction (e.g., digestion reaction) in the vessel 12, (ii) the pressure-stepped chemical reaction includes an alternating series of the closed (e.g., hermitically sealed) configurations and venting configurations, and feedback (e.g., "closing force feedback") is utilized in a manner that seeks to ensure that only gas from a head space of the vessel is vented during the venting configurations (e.g., typically without discharging any of the analyte from the reaction vessel), as discussed further below.

The contents of the vessel 12 are schematically represented by horizontal dashes in FIG. 1. When the contents or composition in the vessel 12 are for a digestion reaction, the composition can include at least one analyte-containing sample and at least one concentrated mineral acid. In some circumstances, a robust extraction is the goal and the composition may include a sample and an organic solvent. For enhancing or facilitating the digestion reaction in the vessel 12, the contents of the vessel (e.g., a sample with an aggressive acid such as nitric acid) can be heated in any suitable manner (e.g., by way of thermal conduction through the vessel wall, radiation passing through the vessel wall and being absorbed by contents of the vessel, and/or dielectric heating). In the depicted embodiment, the vessel 12 is microwave transparent, and contents in the vessel are heated by absorbing microwaves from at least one source of microwave radiation 15 (e.g., a magnetron).

The clamping apparatus can include at least one actuator 16 (e.g., an electric motor) and one or more linkages 18, 20, 22 positioned between the actuator 16 and the closure 14. The system 10 can include one or more sensors 24, 26, 28 and at least one controller 30 (e.g., computer) cooperatively configured, for example, with the actuator 16 and/or linkages 18, 20, 22 to provide closing (e.g., clamping) force feedback, as discussed further below. Communication paths between the controller 30, microwave source 15, actuator 16, and sensors 24, 26, 28 are schematically depicted with dashed lines in FIG. 1, as discussed further below.

The controller 30 can be configured to responsively operate the clamping apparatus so that, during heating of the vessel contents and prior to venting from the vessel, the clamping apparatus can provide a sufficient downwardly-oriented closing force against the closure 14 so that the vessel is hermetically sealed in the closed configuration. In contrast, during (e.g., throughout) the venting process, the closing or clamping force applied by the clamping apparatus against the closure 14 can more closely match (e.g., be slightly less than) an upwardly oriented opening force applied against the closure by pressure in the vessel 12 in a manner that seeks to ensure that only gas in a head space of the vessel is vented (e.g., typically without discharging any of the analyte from the reaction vessel), as discussed further below. The controller 30 can be configured so that, throughout each venting process or cycle, the closing force applied by the clamping apparatus can be adjusted to decrease proportionally with respect to the decreasing upwardly oriented opening force applied against the closure by pressure in the vessel 12 in a manner that seeks to ensure that solely gas in a head space of the vessel is vented (e.g., typically without discharging any of the analyte from the reaction vessel), as discussed further below.

A variety of different types of clamping apparatuses configured to provide the closing or clamping force to at least a portion of the closure 14 are within the scope of this disclosure, as discussed further below. In the embodiment depicted in FIG. 1, the intermediate linkage 20 is a hydraulic system or circuit including at least one hydraulic passageway 31 in fluid communication with between at least one of each of a mechanical-hydraulic converter 32 (e.g., a hydraulic drive) and a hydraulic-mechanical converter 34 (e.g., a hydraulic actuator). The converters 32, 34 may be configured as and/or referred to as master and slave cylinders 32, 34, respectively. That said, the converters 32, 34 are not limited to master and slave cylinders. For example, it is believed that the mechanical-hydraulic converter 32 can be a hydraulic pump in an alternative embodiment of this disclosure.

The master cylinder 32, or the like, can define variable hydraulic volume that is at least partially defined by a master displacement member 36 (e.g., a piston or other suitable structure) mounted for reciprocation in a master chamber 38 (e.g., cylinder or annular sleeve) in fluid communication with the hydraulic passageway 31. Similarly, the slave cylinder 32 (e.g., responsive cylinder) or the like, can define variable hydraulic volume that is at least partially defined by a slave displacement member 40 (e.g., a piston or other suitable structure) mounted for reciprocation in a slave chamber 40 (e.g., cylinder or annular sleeve) in fluid communication with the hydraulic passageway 31.

Hydraulic fluid of the hydraulic circuit 20 is represented schematically by stippling in FIG. 1. The skilled artisan will understand that the pressure exerted by the master displacement member 36 against the hydraulic fluid will be identically exerted everywhere within the hydraulic circuit 20. A hydraulic pressure sensor 24 (e.g., load cell) configured to provide signals indicative of pressure of the hydraulic fluid (and, thus, indirectly the closing force) can be mounted to close an opening to the interior of the hydraulic passageway, or the hydraulic pressure sensor can be associated with the hydraulic circuit 20 in any other suitable manner. The measurement of hydraulic pressure provided by the pressure sensor 24 can be used to calculate (e.g., by the controller 30) the effective sealing or closing force being applied to the closure 14. This closing force data can be referred to as force feedback data that is used (e.g., by the controller 30) to help dynamically seal/vent the vessel 12 based on the pressure in the reaction vessel 12, as discussed further below. Alternatively, a signal indicative of the closing force can be provided by a force sensor (e.g., load cell) associated with a respective mechanical component of the downstream linkage 22.

The downstream linkage 22 can be a mechanical linkage configured to transfer linear downward force from the slave displacement member 40 to the closure 14 on the reaction vessel 12. A force sensor 26 can be associated with (e.g., carried by) the downstream linkage 22 and operatively associated with a movable (e.g., flexible) portion of the closure 14 to provide signals indicative of pressure in the reaction vessel 12, as discussed further below. A temperature sensor 28 can be associated with reaction vessel 12 to provide signals indicative of temperature in the reaction vessel 12 (e.g., the reaction vessel can be in the field of view of an infrared temperature sensor), as discussed further below.

In the depicted embodiment, the hydraulic pressure sensor 24 can provide signals indicative of pressure of the hydraulic fluid, and those signals can be supplied to (e.g., fed back to) the controller 30 as part of the provision of the closing force feedback, as discussed further below. In non-hydraulic embodiments, other structures and methods may be associated with the provision of the closing force feedback. It is believed, for example, that the closing force may be provided by way of purely mechanical structures including a leadscrew, wherein a signal indicative of the closing force can be provided by a strain sensor associated with a respective mechanical component, as discussed further below.

Figure 2:
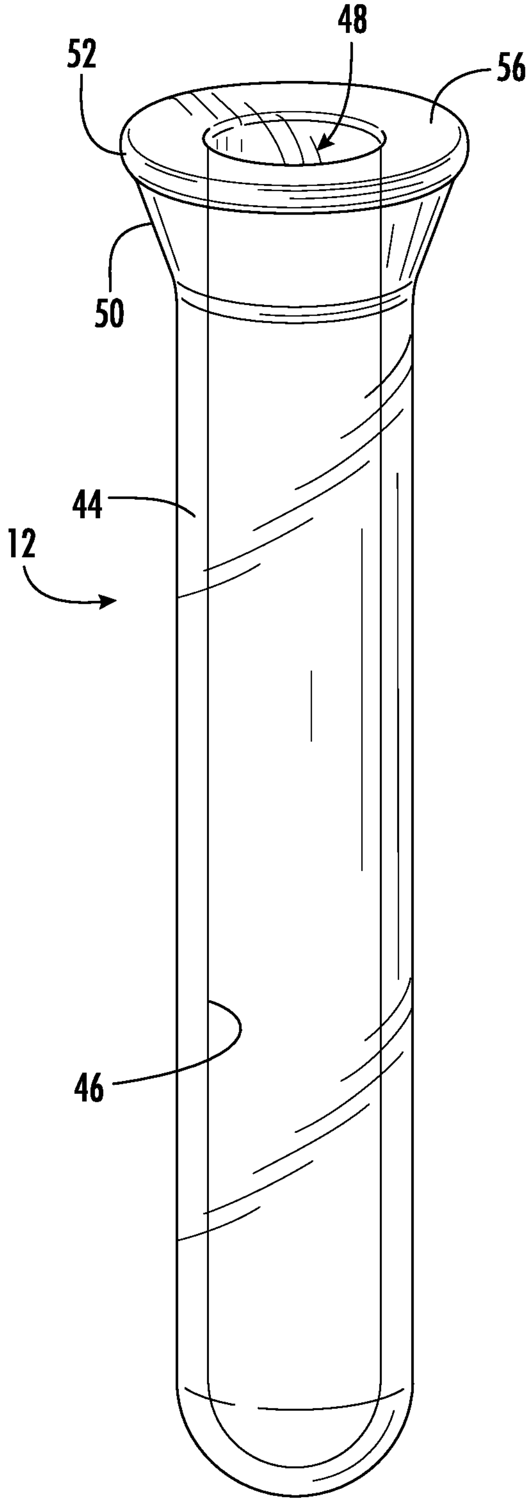
FIG. 2 is a top pictorial view of a reaction vessel of the system of FIG. 1.
Figure 3:
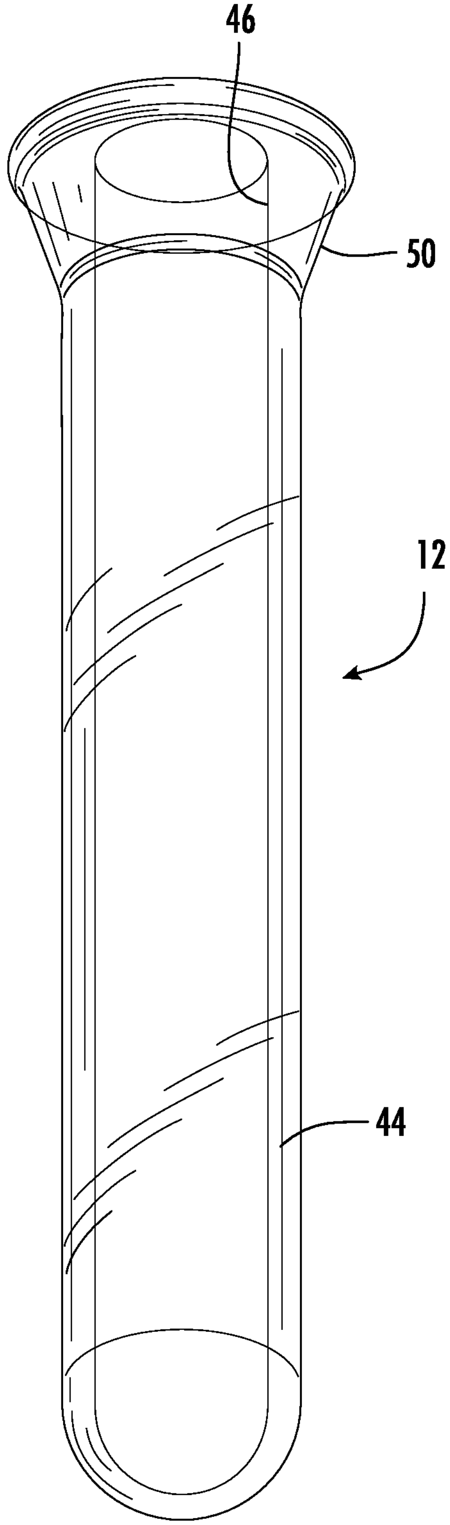
FIG. 3 is a bottom pictorial view of the vessel of FIG. 2.
Figure 4:
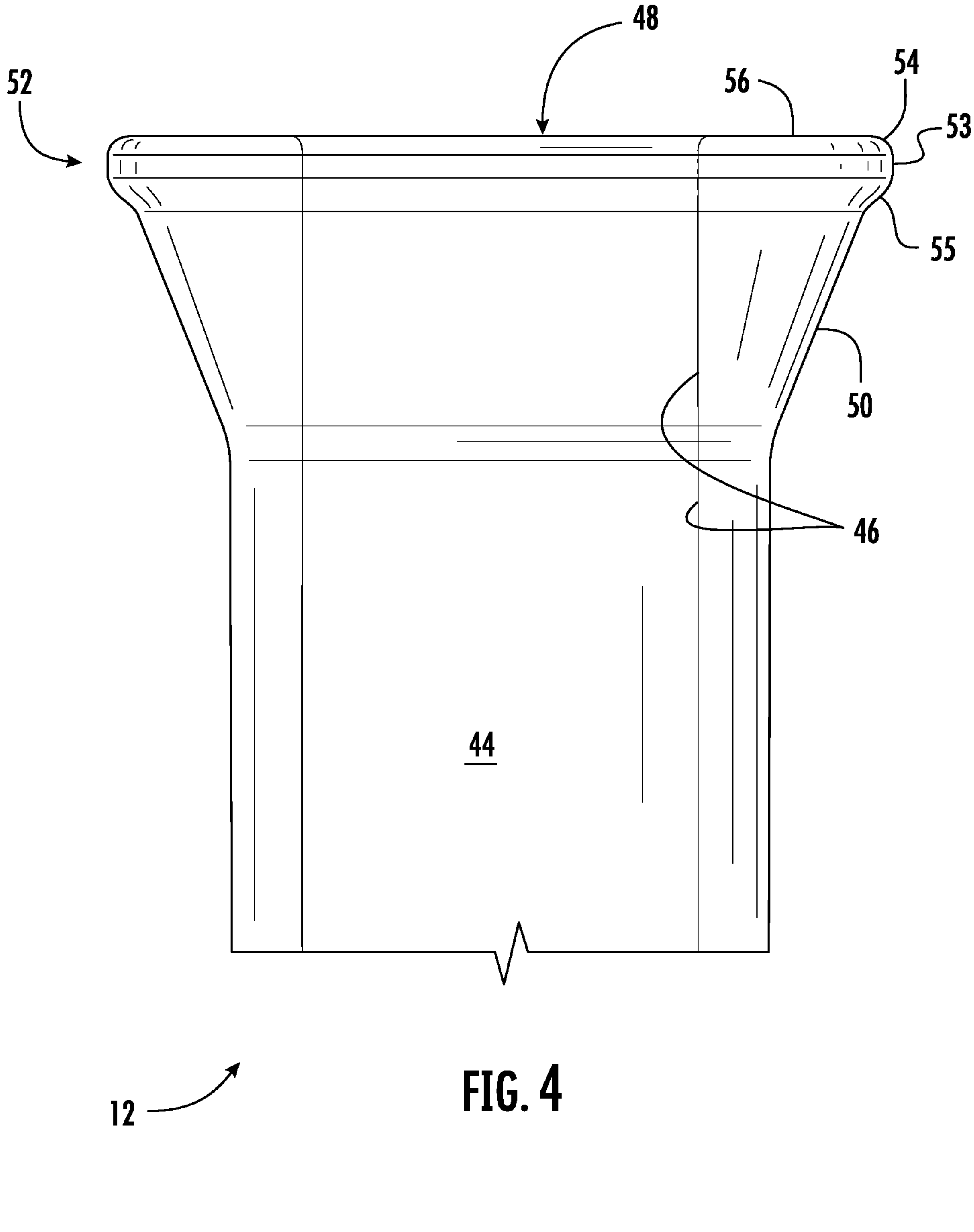
FIG. 4 is representative of each of front, rear, right, and left elevation views of an upper portion of the vessel of FIG. 2.

FIGS. 2-4 depict an exemplary vessel 12. The vessel 12 can include at least one sidewall 44 extending around an upwardly open interior space of the vessel. A lower portion of the vessel sidewall 44 can be cylindrical and extend upwardly from a closed lower end of the vessel 12 that is shaped like an inverted spherical cap. An interior surface portion 46 of vessel sidewall 44 can extend downwardly from the vessel upper opening 48. The vessel interior surface portion 46 can be cylindrical from the upper opening 48 to an upwardly concave interior surface of the vessel lower end.

An annular exterior surface of an upper portion of the vessel sidewall 44 can be tapered in a direction along a height of the reaction vessel 12 to define a frustoconical exterior surface 50 of the vessel 12. The exterior surface of the vessel sidewall 44 extending between the frustoconical surface 50 and the vessel lower end can be cylindrical. Accordingly, the upper portion of the vessel sidewall 44 that defines the frustoconical surface 50 defines a thickness that is greater than the thickness of the lower portion of the vessel sidewall 44. A crosswise dimension or diameter of the frustoconical exterior surface 50 increases in an upright direction along a height of the vessel 12.

The upper end of the vessel sidewall 44 can define and/or the upper end of the vessel 12 can include an outwardly protruding annular flange 52. Referring to FIG. 4, the vessel flange 52 can include an annular (e.g., cylindrical) intermediate exterior surface 53 between annular, chamfered upper and lower exterior surfaces 54, 55. The upper end of the vessel can be in the form of an annular, flat, top seating surface 56 that extends inwardly from an inner edge of the flange upper surface 54 and is coaxial with the vessel opening 48. The opening 48 together with the flange 52 and seating surface 56 may be referred to as the mouth of the vessel. The vessel 12 is typically constructed of a durable material that is transparent to microwave energy (e.g., quartz, glass, and/or suitable high-performance polymeric material). As an example, the portion of the vessel 12 below the frustoconical surface 50 can be like the lower portion of a conventional test tube and/or in any other suitable shape.

Figure 5:
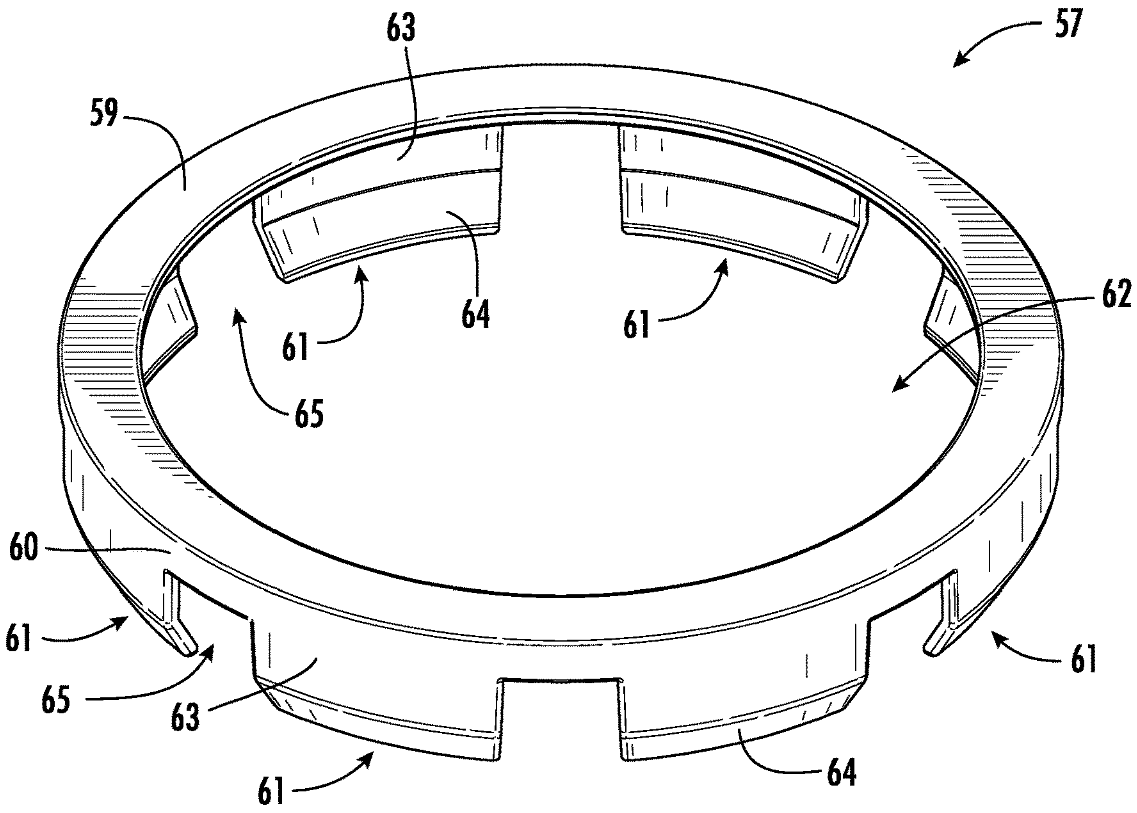
FIG. 5 is a top pictorial view of a band of a closure or cap assembly configured to be mounted on the upper end of the vessel of FIG. 2, in accordance with an embodiment of this disclosure.
Figure 6:
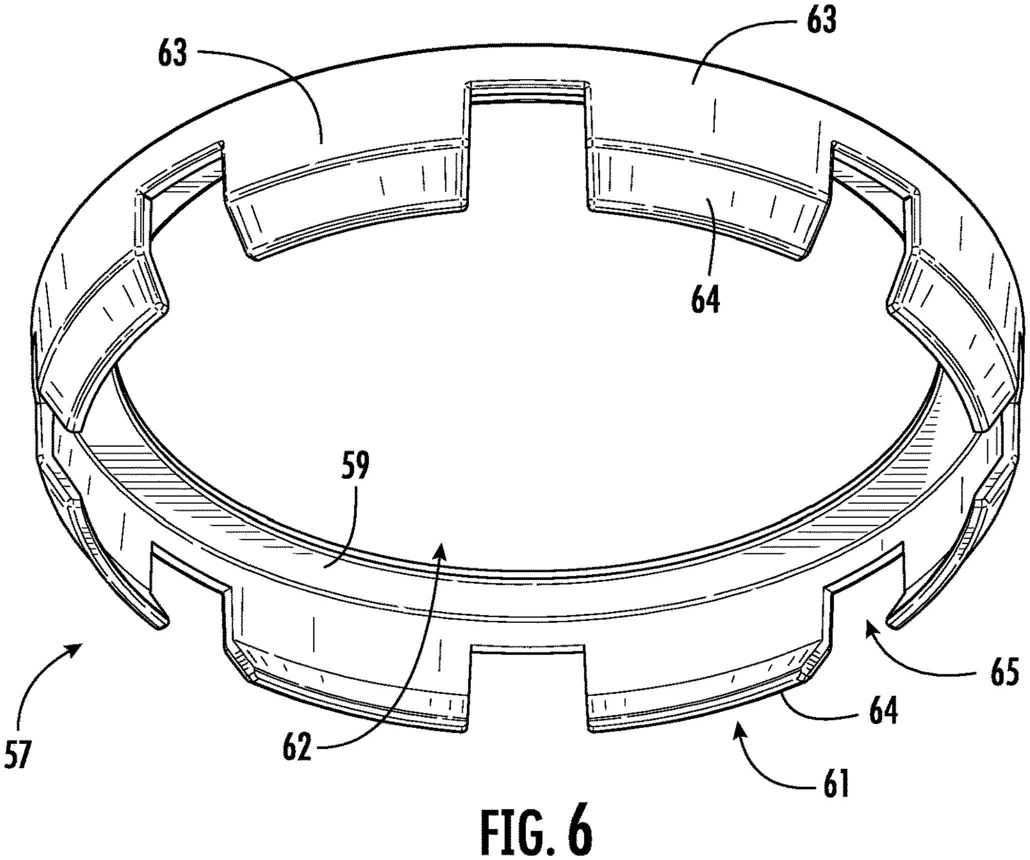
FIG. 6 is a bottom pictorial view of the band of FIG. 5.
Figure 7:
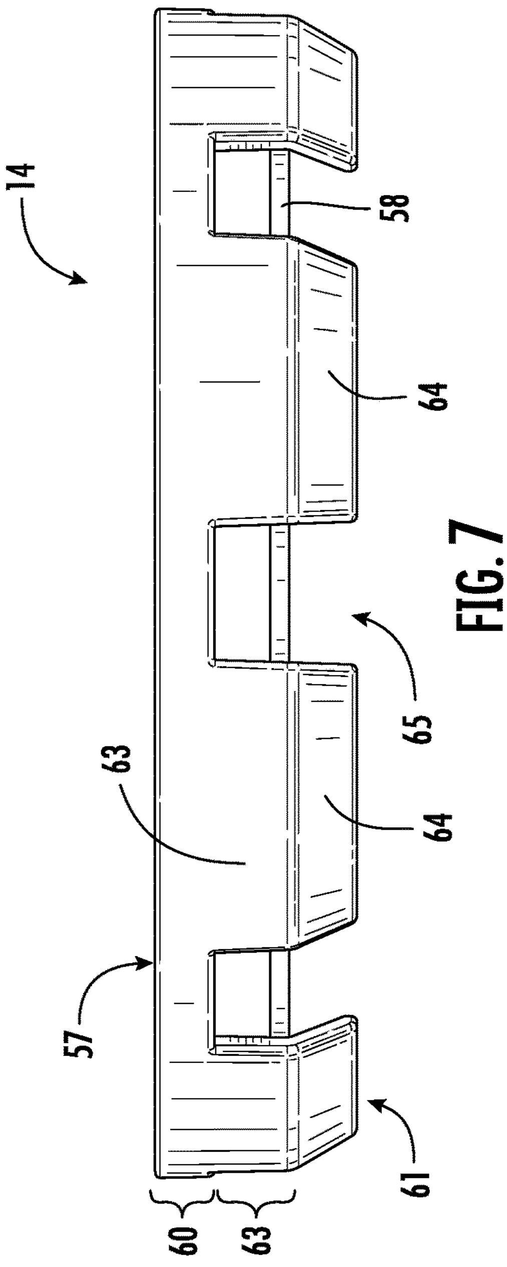
FIG. 7 is representative of each of each of front, rear, right, and left elevation views of the cap assembly in an upright, uninstalled configuration.
Figure 8:
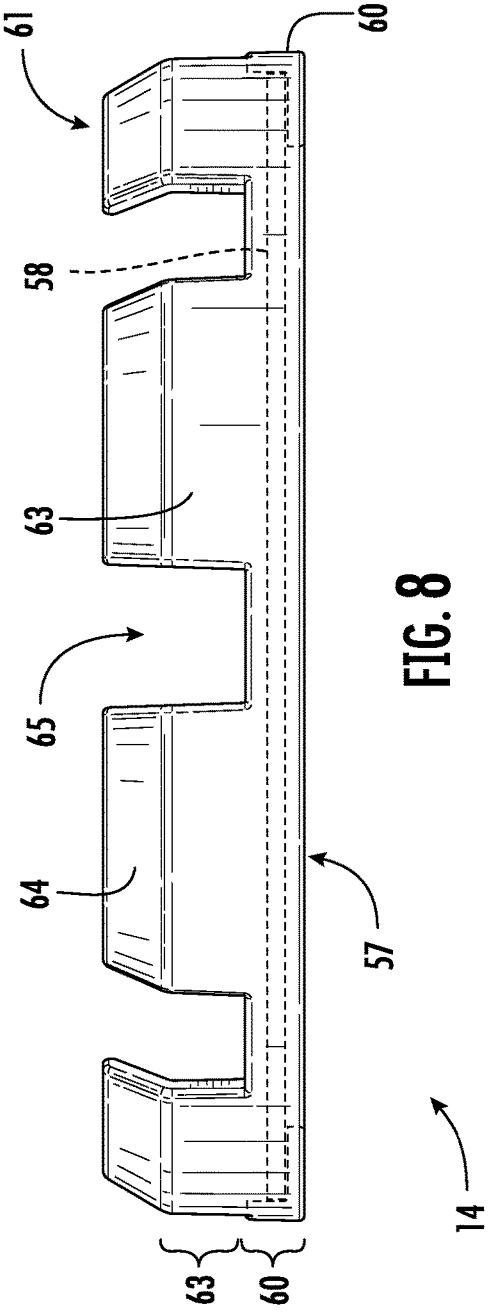
FIG. 8 is representative of each of each of front, rear, right, and left elevation views of the cap assembly in an inverted, uninstalled configuration.

FIGS. 5 and 6 depict an exemplary band 57 of the closure 14 (FIGS. 7 and 8) configured to be snap-fit onto the vessel mouth 48, 52, 56 (FIGS. 2-4). Referring to FIGS. 7 and 8, the closure 14 can be a cap assembly including a lid 58 (e.g., a septum or other suitable obstruction) for use in obstructing the vessel opening 48 (FIG. 2). The band 57 can be configured to releasably retain the lid 58 over the vessel opening 48, as discussed further below.

Referring to FIGS. 5 and 6, the band 57 can include annular flange 59 extending inwardly from an upper end of an annular (e.g., cylindrical) sleeve 60 of the band, and a series of flexible latches 61 extending downwardly from a lower end of the sleeve. The inner edge of the band flange 59 extends around and defines an upper through hole 62 in the top of the band. The series of flexible latches 61 may be referred to as a plurality of latches (e.g., two latches, three latches, four latches, and/or more than four latches).

The band sleeve 60 and upper portions 63 of the band latches 61 can extend perpendicularly from and/or relative to the band flange 59. The free, lower end portions of the band latches 61 can be in the form of inwardly/obliquely extending tabs 64. The openings, spaces, or gaps between adjacent band latches 61 can be referred to as band slots 65. One or more of, or perhaps each of, the band slots 65 may be omitted and or substituted with other features. As another example, one or more of, or perhaps each of, the band slots 65 may extend all the way to the band flange 59 and/or be shaped differently (e.g., as slits and/or openings that are less rectangular). The series of band openings or slots 65 may be referred to as a plurality of openings or slots (e.g., two openings or slots, three openings or slots, four openings or slots, and/or more than four openings or slots). In the orientation depicted in FIGS. 5-7, one or more of, or each of, the band openings or slots 65 (e.g., two openings or slots, three openings or slots, four openings or slots, and/or more than four openings or slots) can be downwardly open and, thus, extend all the way to the lower end of the band sleeve 60.

Referring to FIG. 7, the lid 58 can be a single or multilayer sheet in the shape of a disk. The lid 58 can have a crosswise dimension or diameter that is both slightly smaller than a crosswise dimension or inner diameter of the band sleeve 60 and greater than a crosswise dimensions defined between opposite latch tabs 64 so that the periphery or outer marginal portion of the lid engages and is supported by upper portions of inner surfaces of the latch tabs 64 when the cap assembly 14 is upright. Referring to FIG. 8, the band hole 62 can have a crosswise dimensions or diameter smaller than the crosswise dimension or diameter of the lid 58 so that the lid engages and sits on the band flange 59 when the cap assembly 14 is inverted. FIG. 8 is schematic because the lid 58 is hidden from view and schematically depicted with dashed lines.

The lid 58 can be referred to as a septum formed of a durable material (e.g., resistant to acid and high temperatures) having a sufficient configuration and elastic modules for repeatedly distending and, thereby, reasonably accurately applying force (indicative of pressure in the vessel 12) toward the force sensor 26 (FIG. 1). The lid 58 can be in the form of a disk-shaped sheet of elastic (e.g., flexible) material, for example polymeric material, or more specifically thermoplastic polymeric material such as, but not limited to, a fluorocarbon solid (e.g., polytetrafluoroethylene or PTFE, commonly known as Teflon™). It is believed the lid 58 can be cut (e.g., die cut or laser cut) from an sheet (e.g., extruded or otherwise suitably formed sheet) of polytetrafluoroethylene having a thickness of about 0.030 inches, so that the lid has a thickness of about 0.030 inches, and the polytetrafluoroethylene may or may not include one or more suitable fillers. It is believed the lid 58 comprising (e.g., formed at least partially of, or formed completely of) polytetrafluoroethylene can have a thickness of less than about 0.1 inch, less than about 0.075 inches, less than about 0.050 inches, in a range of from about 0.1 inch to about 0.010 inches, in a range of from about 0.075 inches to about 0.020 inches, in a range of from about 0.050 inches to about 0.025 inches, and/or any values or subranges therebetween.

Similarly, the band 57 can be formed of a durable material having a sufficient configuration and elastic modules for being snap-fit onto the mouth 48, 52, 56 of the vessel 12. The band 57 can be formed from, for example, polymeric material, or more specifically thermoplastic polymeric material such as, but not limited to, polypropylene, for example by injection molding.

Figure 9:
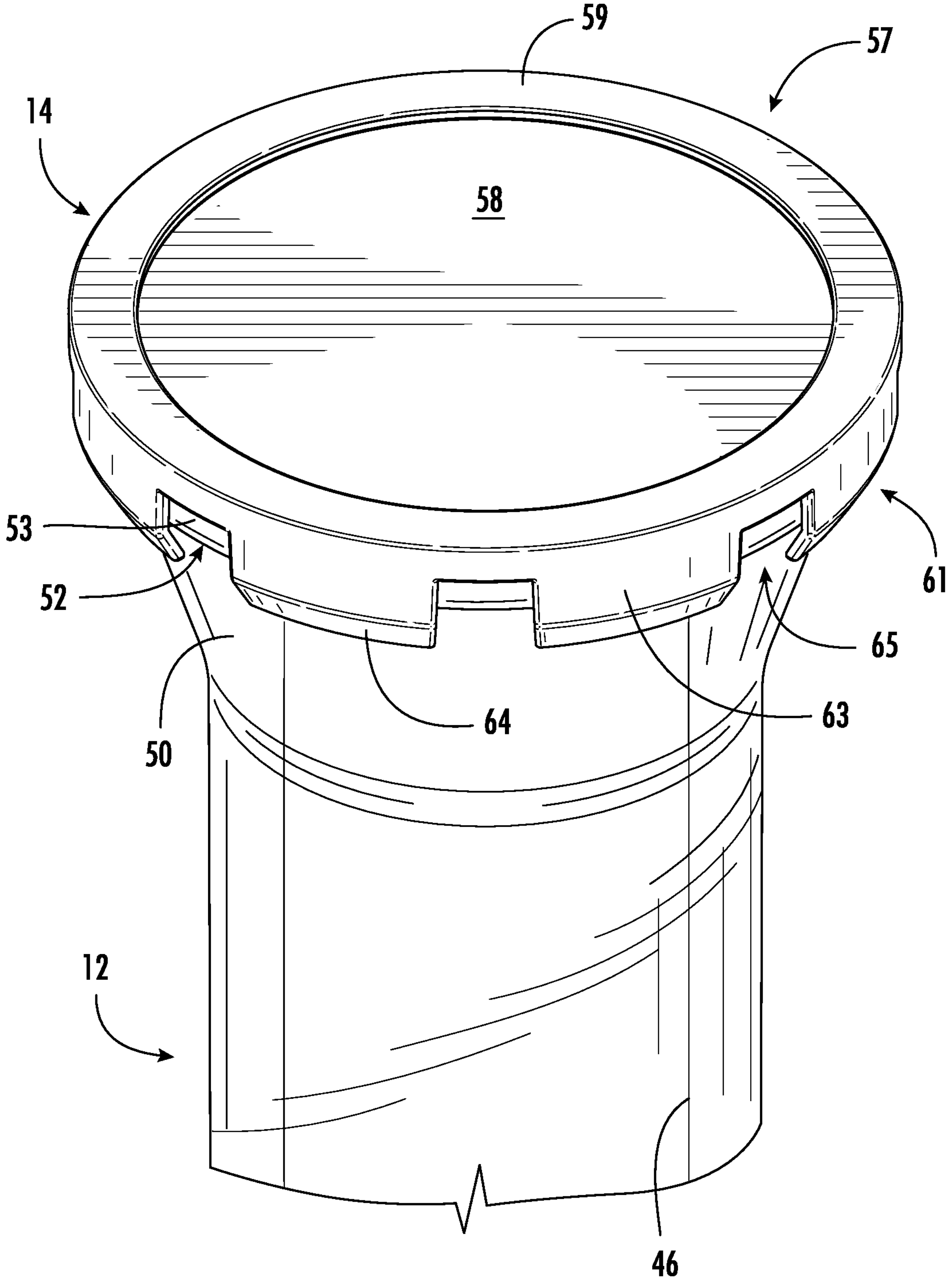
FIG. 9 is a top pictorial view of the cap assembly mounted to the upper portion of the vessel.
Figure 10:
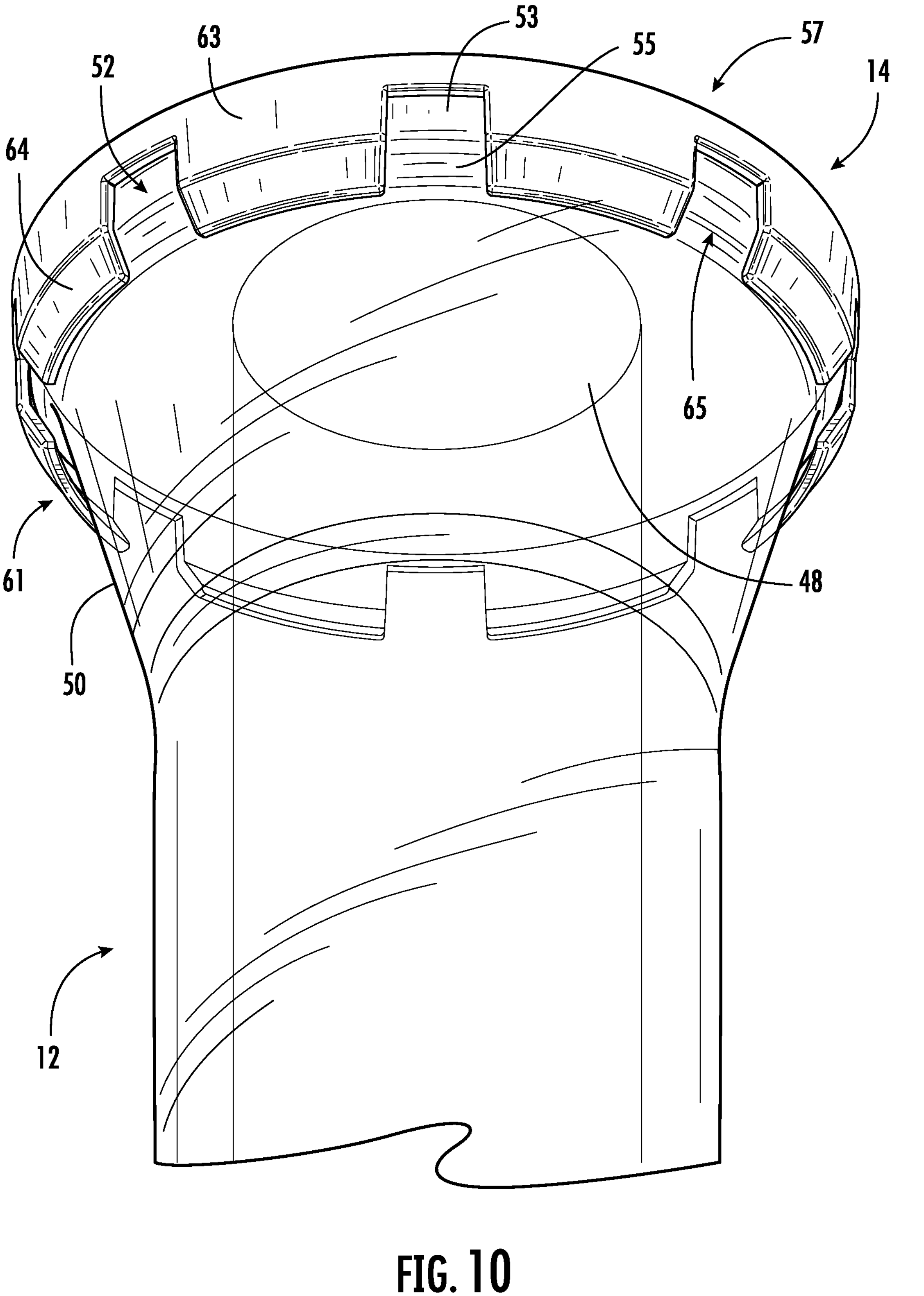
FIG. 10 is a bottom pictorial view of the cap assembly mounted to the upper portion of the vessel.

Referring to FIGS. 9 and 10, the vessel opening 48 (FIG. 2) can be obstructed or, more specifically, closed by way of relative movement between the vessel 12 and the cap assembly 14 (e.g., as configured in FIG. 7) so that the band latches 61 flex outwardly in response to engaging and fitting over the vessel flange 52. After the latch tabs 64 slidingly engage and move past the vessel flange intermediate exterior surface 53, the latch tabs can elastically return to their original shape so that the cap assembly 14 is securely, releasably mounted on the upper end portion of the vessel 12. When the cap assembly 14 is securely, releasably mounted on the upper end portion of the vessel 12 a relatively narrow, annular marginal portion of the upper surface of the lid 58 can be in opposing face-to-face contact with the lower surface of the band flange 59; a relatively wide, annular marginal portion of the lower surface of the lid 58 can be in opposing face-to-face contact with the vessel top seating surface 56 (FIG. 2); the inner surfaces of the upper latch portions 63 can be in opposing face-to-face relation with, or opposing face-to-face contact with, the vessel flange intermediate exterior surface 53; and the inner surfaces of the latch tabs 64 can be opposing face-to-face relation with, or opposing face-to-face contact with, the vessel flange lower surface 55.

The cap assembly 14 can be removed from the vessel 12 (e.g., removed from being securely, releasably mounted on the upper end portion of the vessel 12) in response to relative movement of the between vessel 12 and the cap assembly 14 that separates the vessel and cap assembly 14 from one another. In response to such relative separating movement, the band latches 61 flex outwardly in response to engaging and being slid off of the vessel flange 52. After the latch tabs 64 slidingly engage and move past the vessel flange intermediate exterior surface 53, the latch tabs can elastically return to their original shape so that the lid 58 is retained by the band 14 (e.g., caught and supported by the latch tabs 64), for example in the configuration depicted in FIG. 7 and described above.

The band 57 can function to conveniently facilitate placement or positioning of the lid 58. That said, it is believed that, optionally, the lid 58 may be used without the band 57. Accordingly, the cap or closure 14 may consist solely of the lid 58 in some embodiments, implementations, and/or methods of this disclosure.

Figure 11:
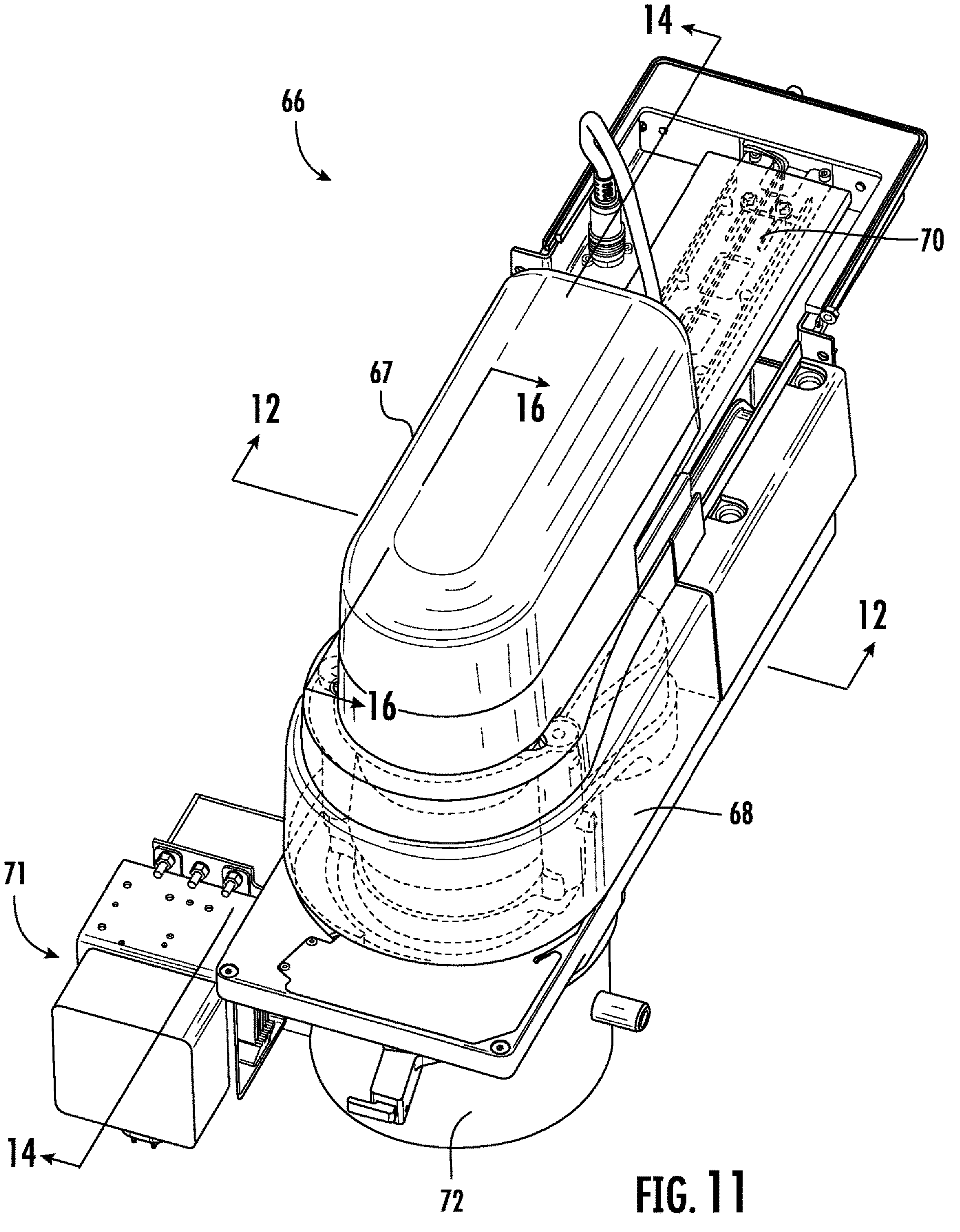
FIG. 11 is a schematic, top pictorial view of a portion of an instrument that includes the system of FIG. 1, in accordance with an embodiment of this disclosure.

FIG. 11 is a top pictorial view of an instrument 66 that includes the system 10 (FIG. 1), and provides a frame of reference for locating certain components. FIG. 11 depicts an upper housing portion 67 and a center housing portion 68. The upper housing portion 67 can move relative to the center housing portion 68 to open the instrument 66 and give access to, for example, the reaction vessel 12 (FIGS. 1-4) which is supported in the center housing portion, as discussed further below. The upper housing portion 67 and items connected thereto can be together reciprocated horizontally relative to the center housing portion 68 by a rack and pinion drive, or other suitable drive. In FIG. 11, the rack and pinion drive is hidden from view, represented by dashed lines, and generally identified by reference number 70.

FIG. 11 also depicts a housing 71 for the magnetron 15 (FIG. 1). The magnetron 15 generates microwave energy that is supplied to a microwave cavity 72. The microwave cavity 72 can be a single mode cavity in waveguide communication with the magnetron 15.

Figure 12:
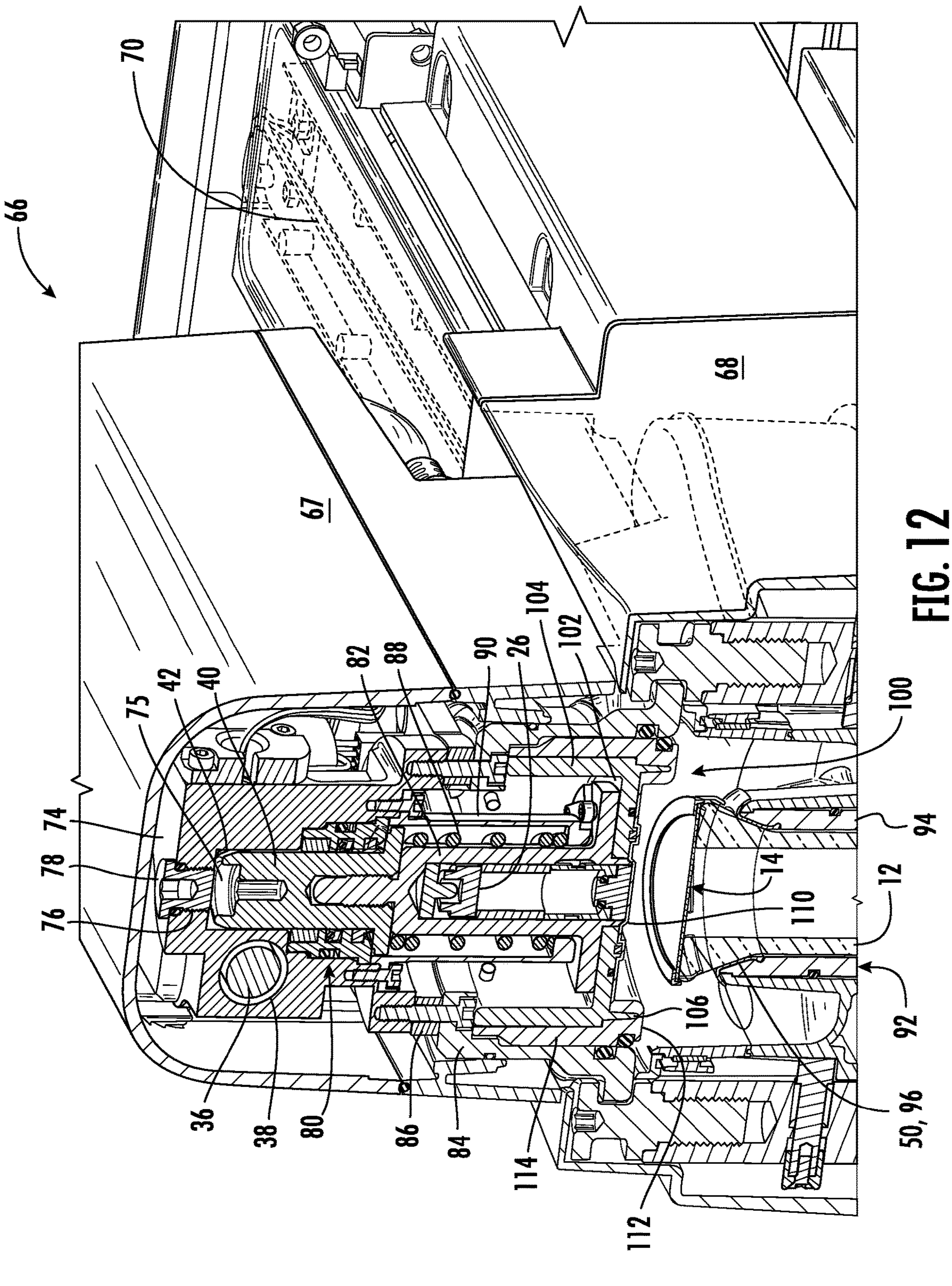
FIG. 12 is a pictorial cross-sectional view of a portion of the instrument of FIG. 11, wherein the cross section is taken substantially along line 12-12 of FIG. 11.

FIG. 12 is a cross-sectional view taken generally along the lines 12-12 of FIG. 11. FIG. 12 depicts the upper housing portion 67 and the center housing portion 68, and some of the components therein. In the orientation of FIG. 12 the master displacement member 36 (e.g., piston) and master chamber 38 (e.g., cylinder or annular sleeve) are at least partially depicted as sections taken perpendicular to their lengthwise axes. The master chamber 38 can be a cylindrical passageway bored horizontally in an upper body 74 of the instrument 66. In the depicted embodiment, the master displacement member 36 and at least one wall of the master chamber 38 define an elongate annular space that is coaxial with the master displacement member and contains some of the hydraulic fluid. The hydraulic fluid is only depicted in FIG. 1, wherein it is depicted schematically by stippling.

The slave chamber 42 can be a cylindrical passageway bored vertically in the upper body 74. The slave displacement member 40 (e.g., piston) can have somewhat of an H-shaped cross-section, the upper portion of which defines a cavity 75 into which the hydraulic fluid extends. In some implementations, the upwardly open cavity 75 in the upper end of the slave displacement member 40 may be omitted. The hydraulic slave chamber 42 (e.g., cylinder or annular sleeve) is in hydraulic communication with the hydraulic master chamber 38 through the hydraulic circuit's hydraulic passageway 31 (FIG. 1), as discussed further below. The hydraulic circuit 20 (FIG. 1) can be filled with hydraulic fluid through a fill hole 76 that is closed by a plug 78 in FIG. 12.

The slave displacement member 40 can be movably mounted for reciprocation in the upper body 74 by at least one or an assembly of mounting and/or sealing parts 80. An extension member 82 can be fixedly mounted (e.g., by an externally threaded shaft extending into an internally threaded bore) to the lower end of the slave displacement member 40 so that the extension member and slave displacement member reciprocate together. The slave displacement member 40 and extension member 82 may be together referred to as a plunger 40, 82 that is mounted for upright reciprocation in an interior space of a downwardly open body or assembly including the upper body 74, a lower body 84, and a plate 86 with a through hole. If desired, it is believed that the slave displacement member 40 and extension member 82 could be formed as a single part. As a practical matter, however, using separate parts makes it easier and thus potentially less expensive to form the slave displacement member 40 to relatively close tolerances while the extension member 82 may be formed with broader tolerances. Like many other parts of the instrument 66, displacement members 36, 40, body portions 74, 84, and plate 86 can be formed of metallic material.

The upper body 74, lower body 84, and plate 86 may together be referred to as an inner housing or body 74, 84, 86 that is carried by the upper housing portion 67 when the upper housing portion reciprocates horizontally relative to the center housing portion 68. It is believed that the inner body 74, 84, 86 may be formed from a lesser or greater number of parts. In FIG. 12, the plunger 40, 82 is in its upper or retracted position within an interior space of the downwardly open inner body 74, 84, 86.

The slave displacement member 40, or more specifically the plunger 40, 82, can be biased towards the retracted position by at least one helical compression spring 88 extending around the extension member 82. The spring 88 can have opposite ends respectively engaged to an outwardly protruding, lower annular flange of the slave displacement member 40 and a inwardly protruding, lower annular flange of a mounting sleeve 90. An outwardly protruding, upper annular flange of the mounting sleeve 90 can be fixedly mounted to upper body 74 by fasteners and/or any other suitable devices. A upper surface of an outwardly extending, annular lower flange of the extension member 82 can engage a lower surface of the lower flange of the mounting sleeve 90 to restrict or arrest upward movement of the plunger 40, 82.

With continued reference to FIG. 12, a support or holder for the vessel 12 can include an upwardly open receptacle 92 fixedly mounted in the center housing portion 68 for removably receiving and securely supporting the vessel 12. The support in the form of the receptacle 92 can include at least one sidewall 94 extending around an upwardly open interior space of the receptacle. A lower portion of the inner surface of the receptacle sidewall 94 can be cylindrical and have a cross-wise dimension or diameter slightly larger than the outer cross-wise dimensions or diameter of the cylindrical portion of the vessel 12. An annular inner surface of an upper portion of the receptacle sidewall 94 can be tapered in a direction along a height of the receptacle 92 to define a frustoconical inner surface 96 of the receptacle. The frustoconical inner surface 96 can define the upper opening to the receptacle 92. A crosswise dimension or diameter of the frustoconical inner surface 96 increases in an upright direction along a height of the receptacle 92. The frustoconical surfaces 50, 96 have the same or about the same slope as one another and are in opposing face-to-face contact with one another in a manner that seeks to distribute the contact-based forces therebetween over a broad surface area to reduce the force per unit area (stress) as compared to typical flange-based engagement.

In FIG. 12, the cap assembly 14 is mounted on the upper end of the vessel 12 as discussed above with reference to FIGS. 9 and 10, and the lower end of the plunger 40, 82 is positioned above and spaced apart from the cap assembly. Reiterating from above, in FIG. 12 the plunger 40, 82 is in its upper or retracted position. In the depicted embodiment, the plunger 40, 82, or more specifically the extension member 82, has mounted thereto several features for being engaged against and/or cooperatively associated with the cap assembly 14 on the vessel 12 which is being supported by the holder or receptacle 92. Alternatively, it is believed that in some implementations the slave displacement member 40 or extension member 82 may be configured to be more directly associated with (e.g., may directly engage) the cap assembly 14.

In the example depicted in FIG. 12, an engager 100 (e.g., engagement apparatus) is fixedly connected to the extension member 82 for reciprocating with the plunger 40, 82 and engaging the cap assembly 14. The engager 100 can be formed of a single part or multiple parts. In the example depicted in the drawings, an inner part of the engager or engagement apparatus 100 includes a backing structure in the form of an annular back plate 102. The inner part of the engagement apparatus can further include an annular sleeve 104 extending upwardly from the periphery of the back plate 102, and an annular flange 106 extending downwardly from the annular sleeve 104 and/or the back plate 102. The back plate 102 can be fixedly connected to the flange of the extension member 82 with, for example, suitable mechanical fasteners. The lower face of the back plate 102 can have an undulating shape, as discussed further below. Like many other parts of the instrument 66, the extension 82 and inner part of the engagement apparatus 100 can be formed of metallic material.

The inner part of the engagement apparatus 100 can be fixedly secured to an outer part of the engagement apparatus. The outer part of the engagement apparatus 100 can include an engagement disk 110, an annular U-shaped channel 112, and annular sleeve 114. The inner annular wall of the channel 112 can extend downwardly from the periphery of the engagement disk 110. The sleeve 114 can extend upwardly from the outer annular wall of the channel 112 and be engaged in opposing face-to-face, sliding contact with a coaxial cylindrical inner surface (e.g., guideway) of the lower body 64. The flange 106 of the inner part of the engagement apparatus 100 can fit (e.g., interference fit) into the annular opening defined by the channel 112. The outer part of the engagement apparatus 100 can be made of elastic (e.g., flexible) material, for example polymeric material. As an example, it is believed the outer part of the engagement apparatus 100 may be made of thermoset polymeric material such as, but not limited to, synthetic rubber (e.g., neoprene or polychloroprene). As a more specific example, the outer part of the engagement apparatus 100 can be made of thermoplastic polymeric material such as, but not limited to, a fluorocarbon solid (e.g., perfluoroalkoxy alkane). The outer part of the engagement apparatus 100 and/or portions thereof can be in the form of and/or be referred to as a membrane or flexible membrane. Accordingly, the disk 110 can be referred to as a flexible engagement web or flexible engagement membrane, and it can have an undulating shape, as discussed further below.

Figure 13:
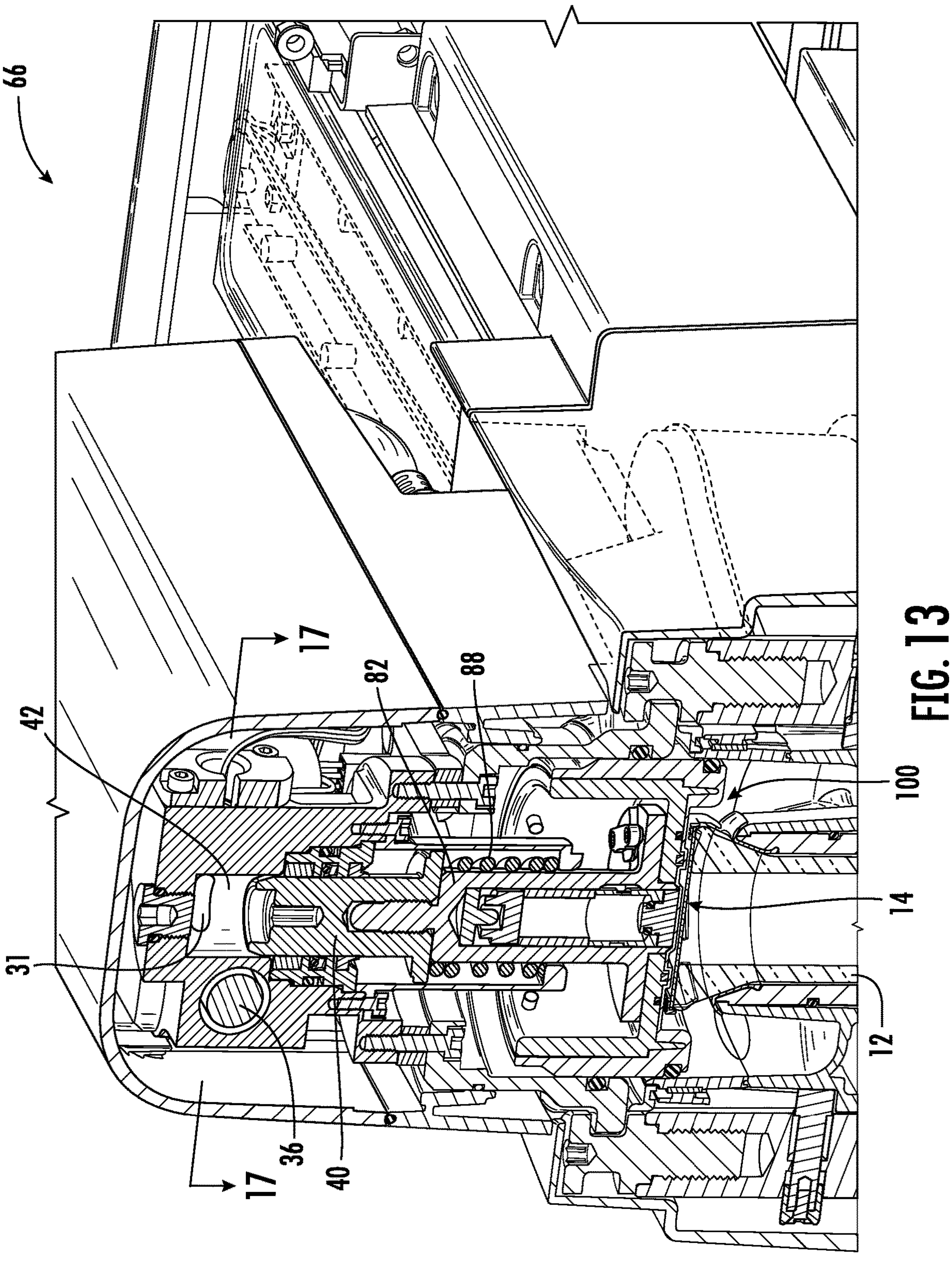
FIG. 13 is similar to FIG. 12, except the plunger apparatus is in a lower position, in accordance with an embodiment of this disclosure.

With continued reference to FIG. 12, the force sensor 26 can be positioned in an interior cavity of the extension member 82 and be operatively associated by way of a linkage with a central portion of the disk 110 (e.g., engagement membrane), as discussed further below. In FIG. 12, the plunger 40, 82 together with the engagement apparatus 100 are in their upper configuration in response the spring 88 being in its expanded state in response to relatively low hydraulic pressure in the hydraulic system. In contrast, in FIGS. 13-15 the plunger 40, 82 together with the engagement apparatus 100 are in their lower configuration, and the spring 88 is compressed, in response to relatively high hydraulic pressure in the hydraulic system.

Figure 14:
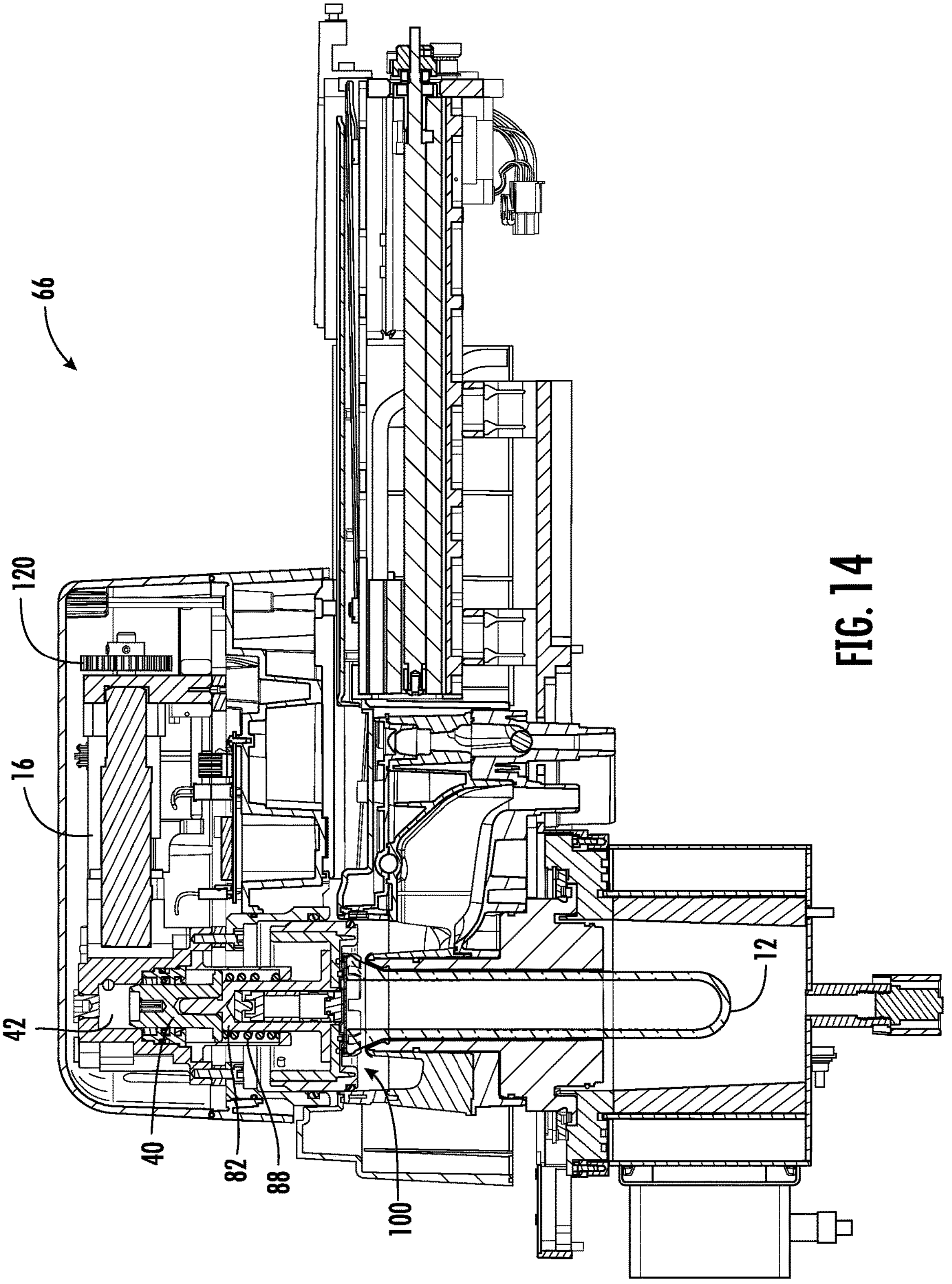
FIG. 14 is a cross-sectional view of a portion of the instrument of FIG. 11 taken substantially along line 14-14 of FIG. 11.
Figure 15:
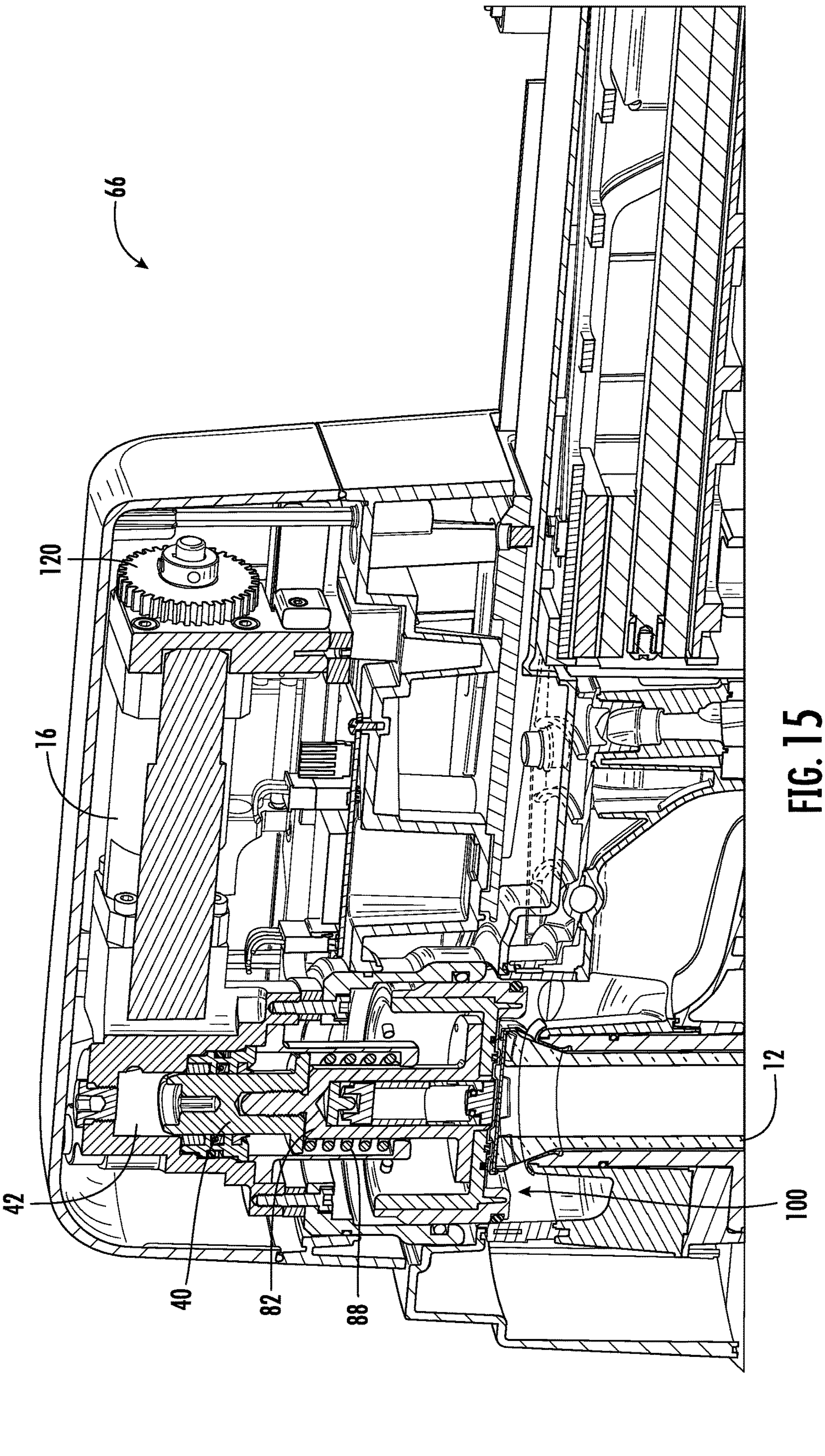
FIG. 15 is pictorial view similar to FIG. 14.
Figure 16:
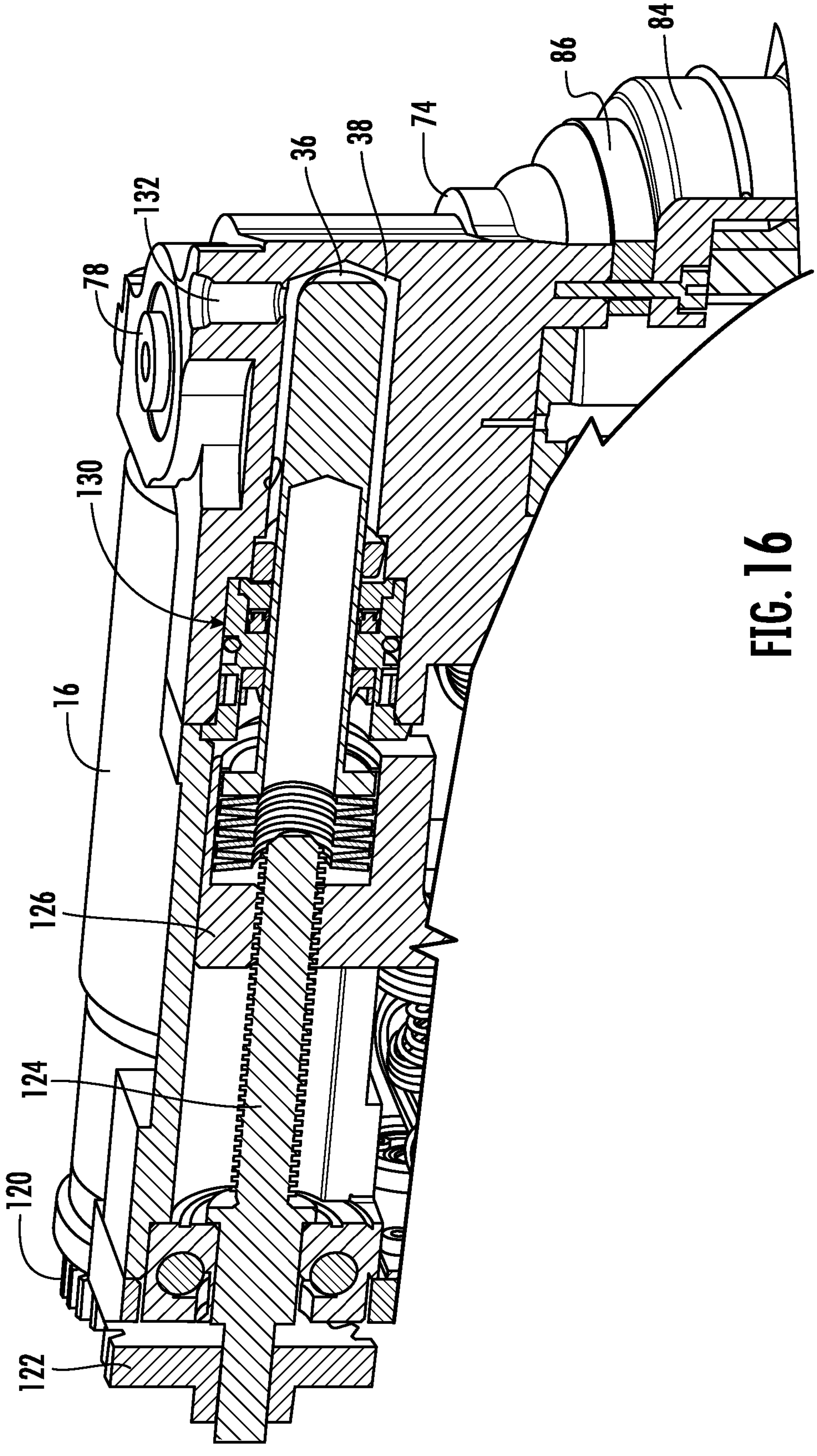
FIG. 16 is a schematic cross-sectional view of a portion of the instrument of FIG. 11 taken substantially along line 16-16 of FIG. 11.

Referring to FIGS. 14 and 15, the actuator 16 can be in the form of an electric motor that rotatably drives a motor gear 120. Referring to FIG. 16, the motor gear 120 can mesh with and reciprocatively drive a lead gear 122. The lead gear 122 can be coaxial with and fixedly mounted to the shaft of a leadscrew 124 for rotating the leadscrew. External screw thread(s) of the leadscrew 124 can mesh with internal screw thread(s) of a drive nut 126 that is supported for reciprocating along a guideway. The master displacement member 36 can be connected to or otherwise associated with the drive nut 126 for reciprocating with the drive nut in response to operation of the actuator or motor 16. One or more spring washers can be positioned in a cavity of the drive nut 126 and be engaged against an outer end of the master displacement member 36. Alternatively, the drive nut 126 can be replaced with a ball screw or other suitable device for converting rotational motion to linear motion.

The master displacement member 36 can be movably mounted for reciprocation in the upper body 74 by at least one or an assembly of mounting and/or sealing parts 130. The hydraulic circuit 20 (FIG. 1) can include at least one other hole 132 configured for use in filling and/or venting the hydraulic circuit, and the hole 132 is typically closed by a plug (see, e.g., plug 78).

Figure 17:
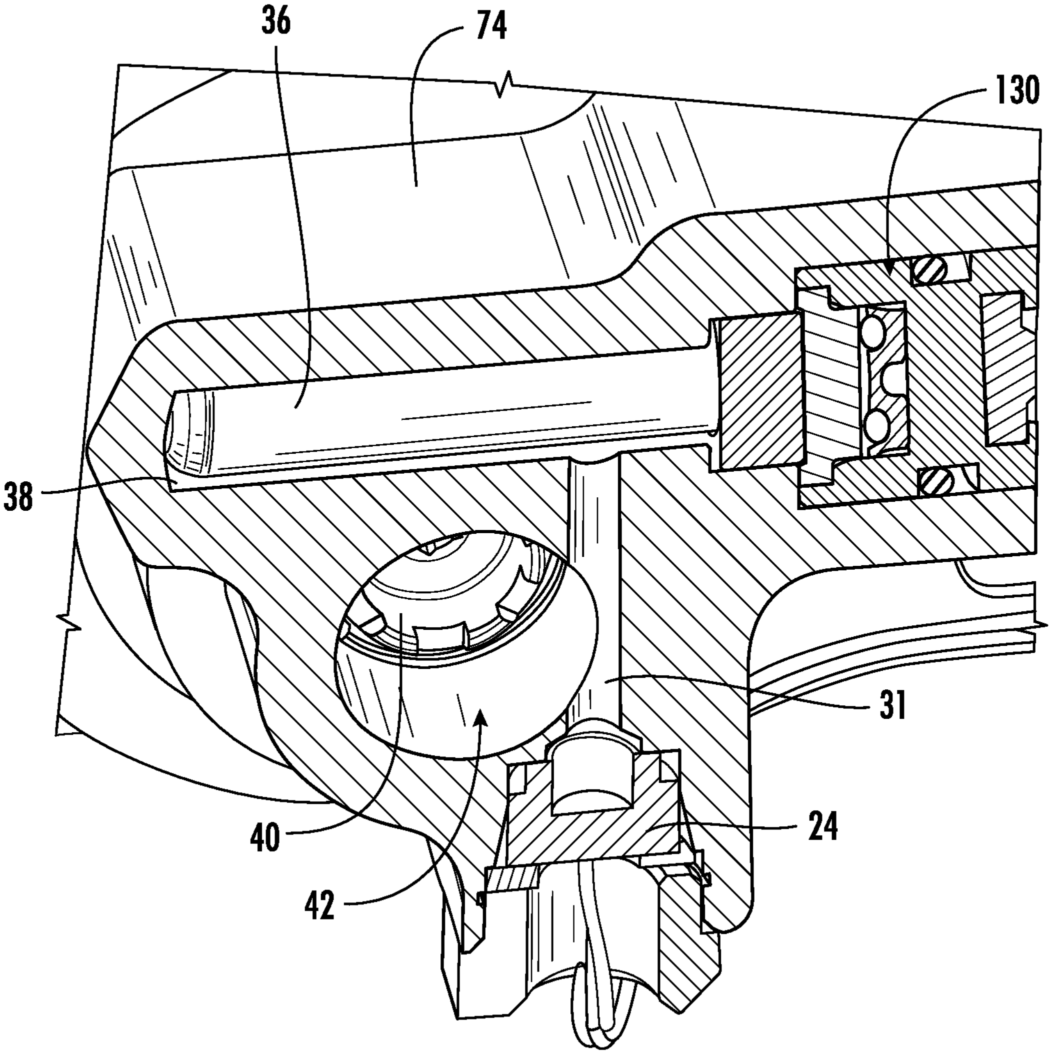
FIG. 17 is a cross-sectional view of a portion of the instrument of FIG. 11 taken substantially along line 17-17 of FIG. 13.

Referring to FIG. 17, the master and slave chambers 38, 42 can be elongate holes bored into the upper body 74, and axes of these chambers can extend crosswise (e.g., perpendicular) to one another. Similarly, the hydraulic passageway 31 connecting the chambers 38, 42 can be an elongate hole bored into the upper body 74. The pressure sensor 24 can be mounted in an outer end portion of the hydraulic passageway 31.

Figure 18:
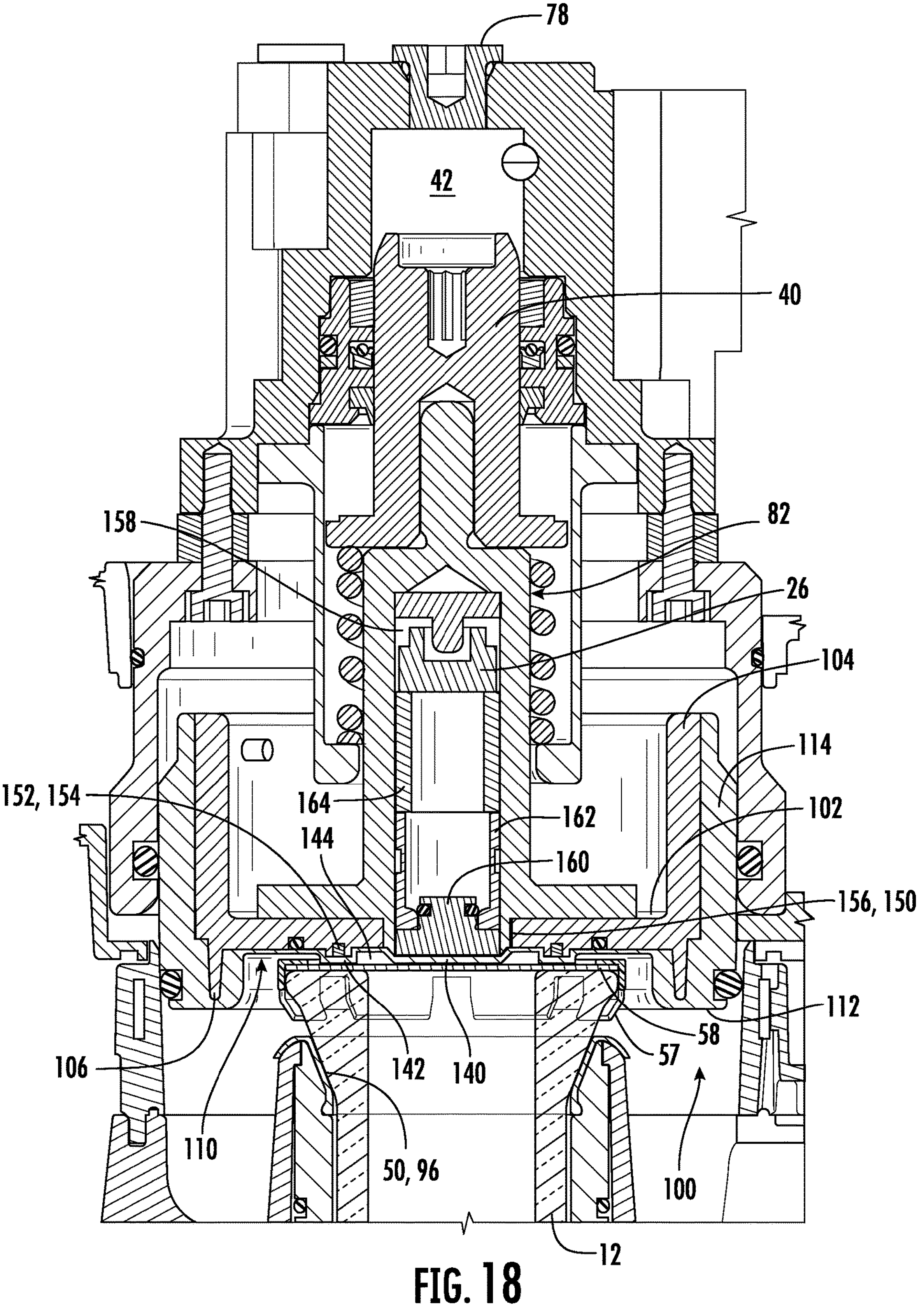
FIG. 18 is similar to FIG. 13.

FIG. 18 is a cross sectional view depicting, for example, the plunger 40, 82 and engagement apparatus 100 in their lower configurations such that the lid 58 is being clamped downwardly to close the vessel 12 while pressure in the vessel is equal to ambient pressure (e.g., such that the lid is not upwardly distended).

In the example depicted in FIG. 18, the engagement membrane or disk 110 includes an annular, downwardly protruding central portion (e.g., inner protrusion 140), and an annular, downwardly protruding outer portion (e.g., outer protrusion 142) extending around and spaced apart from the central portion. As a result, the engagement disk 110 (e.g., membrane) defines an annular, upwardly extending recessed cavity 144 positioned between the inner and outer protrusions 140, 142.

The back plate 102 can include a through hole 150 and a downwardly protruding portion (e.g., protrusion 152) generally extending around and spaced apart from the hole 150. The engagement disk's outer protrusion 142 can be defined by an annular undulation in the web material of the engagement membrane or disk 110, and the upper side of that undulation can define an annular channel into which the back plate protrusion 152 extends. The back plate protrusion 152 can define a downwardly open annular channel into which an engagement ring 154 is received (e.g., press fit). The engagement ring 154 can be made of softer, more elastic material than the back plate 102. For example, the engagement ring 154 can be a polymeric, flexible, elastomeric O-ring configured in a manner that seeks to provide compliance and improve sealing efficiency (e.g., the lower portion of the engagement ring 154 can protrude downwardly outwardly from the back plate 102 or the pack plate protrusion 152.

The extension member 82 can include a lower annular flange 156 that extends through the back plate hole 132. The extension flange 156 can define an opening to a cylindrical cavity 158. The force sensor 26 can be positioned in the extension cavity 158 and be directly or indirectly engaged with the inner side of the engagement disk's inner protrusion 140. In FIG. 18, a linkage positioned in the extension cavity 158 between the force sensor 26 and the inner protrusion 140 includes a serial arrangement of a disk 160 and one or more sleeves 162, 164. The disk 160 and sleeves 162, 164 are slidably and reciprocatively movable in the extension cavity 158 to transfer force to the force sensor 26.

Figure 19:
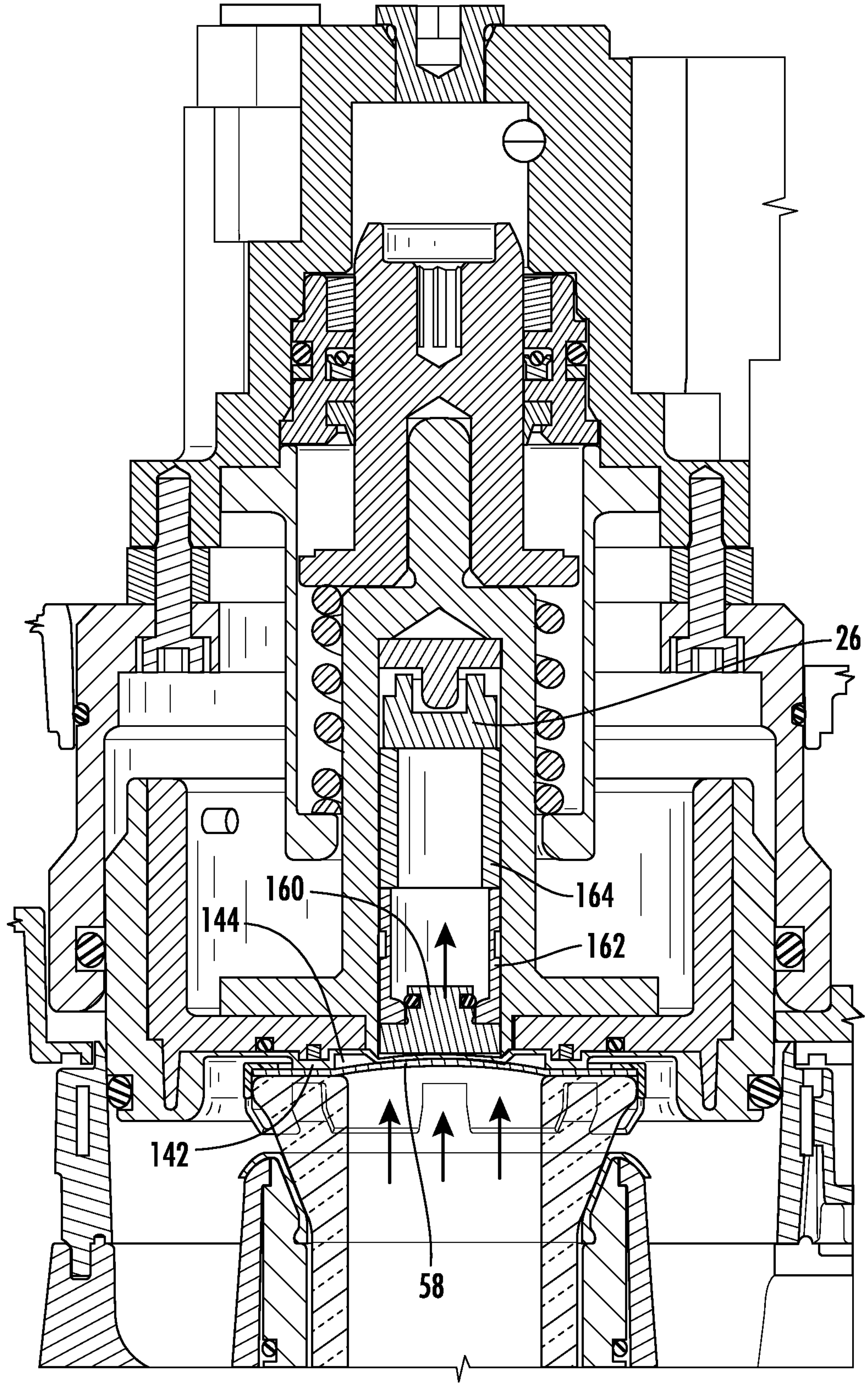
FIG. 19 is similar to FIG. 13, and schematically depicts pressure within the vessel causing a portion of the cap assembly to bulge outwardly and apply and upward force.

In the example of the vessel 12 being sealed closed and containing contents under pressure as depicted in FIG. 19, upward force (schematically represented by upright arrows in FIG. 19) exerted by the flexed (e.g., distended) lid 58 and indicative of pressure in the vessel 12 is transferred to the force sensor 26 by way of the disk 160 and sleeves 162, 164. Alternatively the subject force can be received by the force sensor 26 is a relatively more or less direct manner.

In the example depicted in FIG. 19, a portion of the flexed (e.g., distended) lid 58 extends partially into the recessed cavity 144 of the engagement disk or membrane 110. Generally described, the recessed cavity 144 is a geometric feature that helps create more accurate readings of the pressure in the vessel 12, for example by accommodating portions (e.g., displaced material) of the lid 58. The clamping process may, for example, squish a portion of the lid 58 adjacent the clamping protrusion 142 so that associated displaced portions of the lid move into the cavity 144 in a manner that seeks to avoid inaccurate measurements by the force sensor 26. As another example, the lid 58 may expand when heated, and the recessed cavity may accommodate such expansion in a manner that seeks to avoid inaccurate measurements by the force sensor 26. The geometric feature, or more specifically the cavity 144, may be configured differently.

Figure 20:
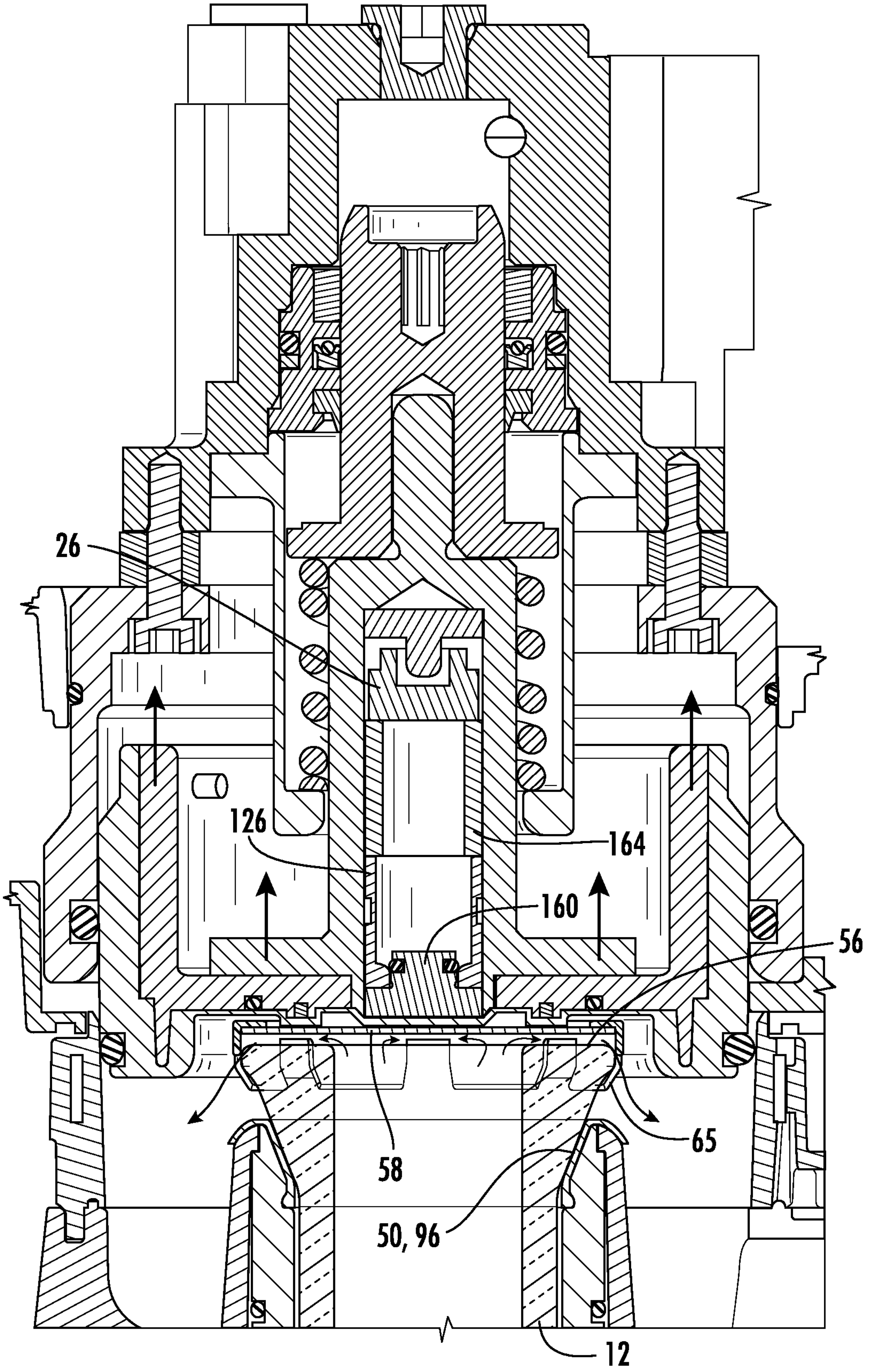
FIG. 20 is similar to FIG. 13, and schematically depicts the plunger apparatus/cap assembly in a venting configuration, and outward venting from the vessel (e.g., a vent gap is exaggerated for purposes of illustration).

In the example depicted in FIG. 20, the vessel 12 is slightly open so that it contains contents under pressure but the pressure is being reduced by outward venting from the vessel through at least one gap defined between the lower surface of the lid 58 and the mouth (e.g., seating surface 56 (FIG. 2)) the of the vessel 12. The size of the gap is exaggerated in FIG. 20 for ease of illustration and viewing. The one or more vent paths schematically represented by the lower arrows in FIG. 20 can extend through one or more of the band slots 65 (FIGS. 5-10) or other suitable openings or gaps.

In FIG. 20, while venting, the vessel 12 remains partially closed by the lid 58 (e.g., the lid is sufficiently obstructing the vessel opening 48) so that upward force continues to be exerted against the lid 58 and force indicative of pressure in the vessel 12 is transferred to the force sensor 26 by way of the disk 160 and sleeves 162, 164.

Figure 21:
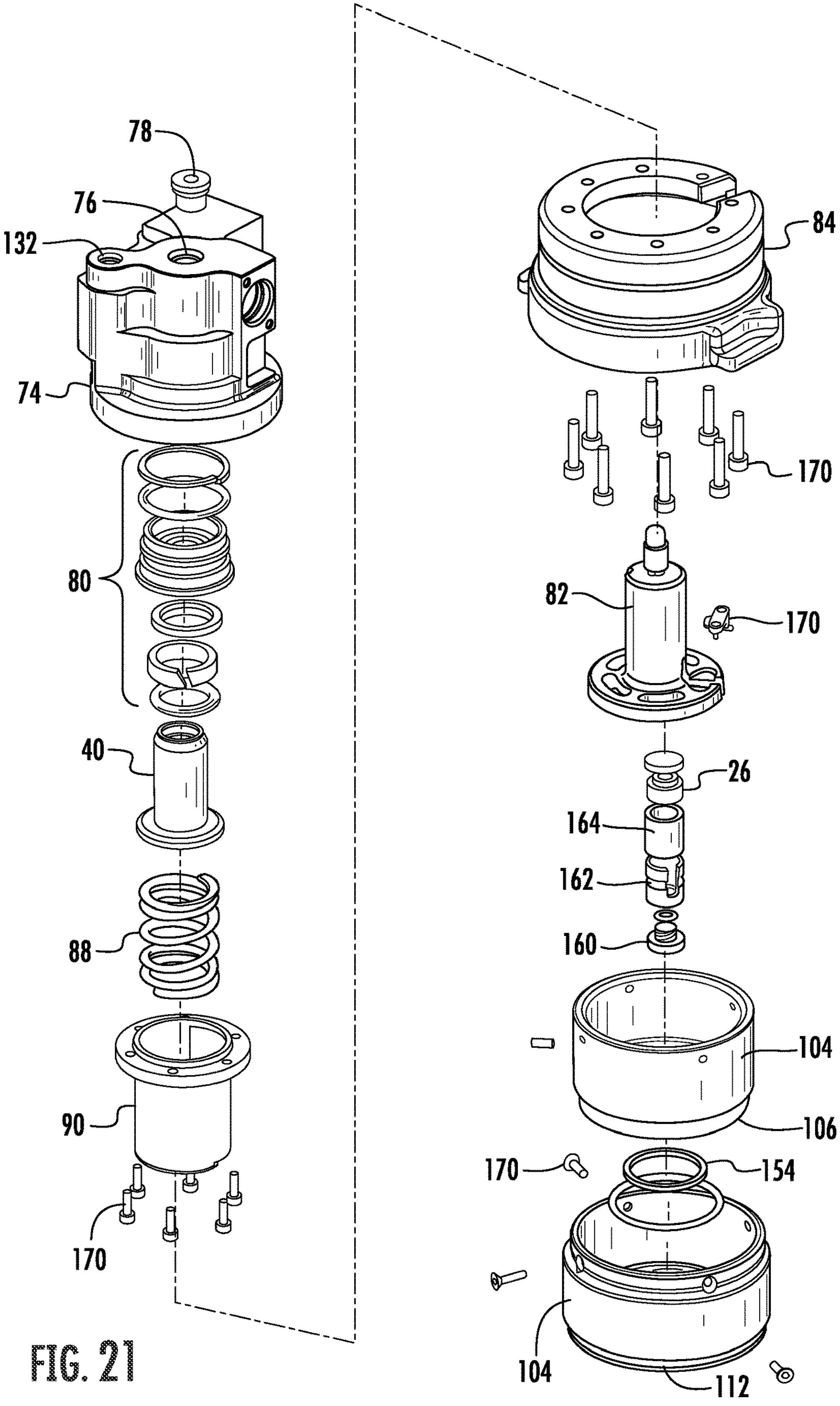
FIG. 21 is an exploded view of the plunger, and engagement apparatus, and some of the parts of the associated housing of the instrument.

FIG. 21 is an exploded view of numerous parts of the instrument 66 (FIGS. 11-15). For example, some of the mechanical fasteners that connect respective parts to one another are designated by numeral 170 in FIG. 21.

Figure 22:
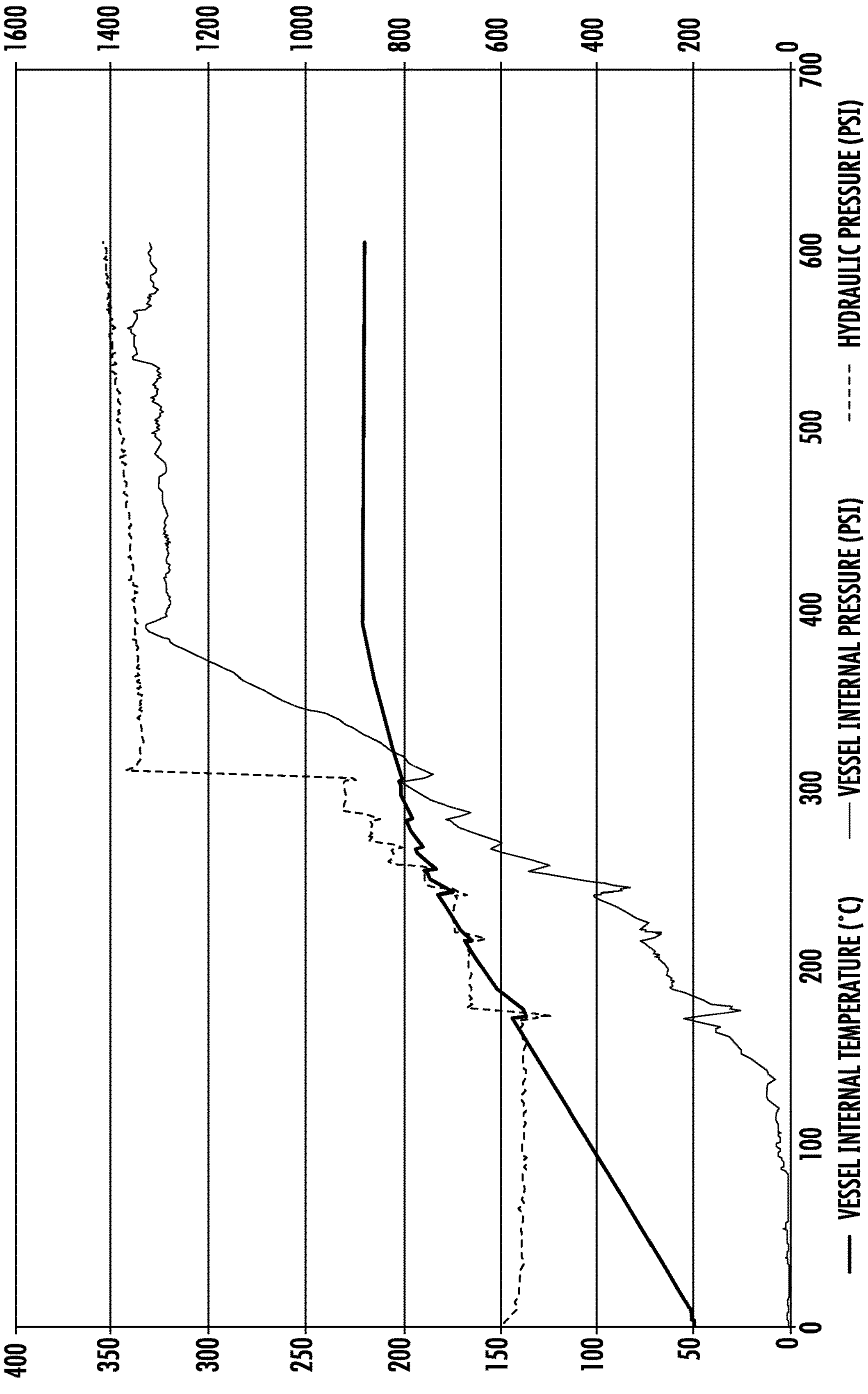
FIG. 22 is a chart depicting operational parameters of an exemplary pressure-stepped chemical reaction with periodic venting, in accordance with an embodiment of this disclosure.

FIG. 22 is a chart that depicts operational parameters of an exemplary pressure-stepped digestion chemical reaction performed with the instrument 66 and including periodic venting from the head space of the associated vessel 12. In FIG. 22, the key or legend of the chart identifies the lines that respectively represent the temperature of the contents in the vessel 12, the pressure in the vessel, and the pressure of the fluid in the hydraulic circuit 20. The left vertical axis includes the scale for the temperature of the contents in the vessel 12. The right vertical axis includes the scale for the pressure of the fluid in the hydraulic circuit 20. The relatively thin line representing the pressure in the vessel 12 was overlaid on the graph depicted in FIG. 22 to show the relationship between pressure in the vessel and the hydraulic pressure in the hydraulic circuit 20.

Various examples are discussed in the following with reference to the example illustrated by FIG. 22. In FIG. 22, each of the seven periods of venting from the vessel 12 can be identified by the portions of the line indicative of vessel internal pressure that are "substantially" downwardly inclined to the right from a peak to a low point and are respectively vertically coincident with both (i) the portions of the line indicative of hydraulic pressure that are "substantially" downwardly inclined to the right from a peak to a low point, and (ii) the portions of the line indicative of vessel internal temperature that are "substantially" downwardly inclined to the right from a peak to a low point. There can be less than or more than seven periods of venting (e.g., there be one or more periods of venting from the vessel 12).

Each of the line portions that are described above as being "'substantially' downwardly inclined to the right from a peak to a lower point" can be referred to as a backslash portion (e.g., "\") for ease of reference. In contrast, the line portions that are upwardly inclined to the right from a lower point to a peak can be referred to as a slash portion (e.g., "/") for ease of reference. In FIG. 22, the peak of at least some or each backslash portion (e.g., "\") of the line indicative of vessel internal pressure can be referred to as an internal vessel pressure vent point. In FIG. 22, at least some or each of the peaks of the slash portion (e.g., "/") of the line indicative of hydraulic pressure can be referred to as a hydraulic pressure setpoint and/or at least some or each of the generally horizontal portions of the line indicative of hydraulic pressure that precede the backslash portion (e.g., "\") of the line indicative of hydraulic pressure can be referred to as a hydraulic pressure setpoint.

Figure 23:
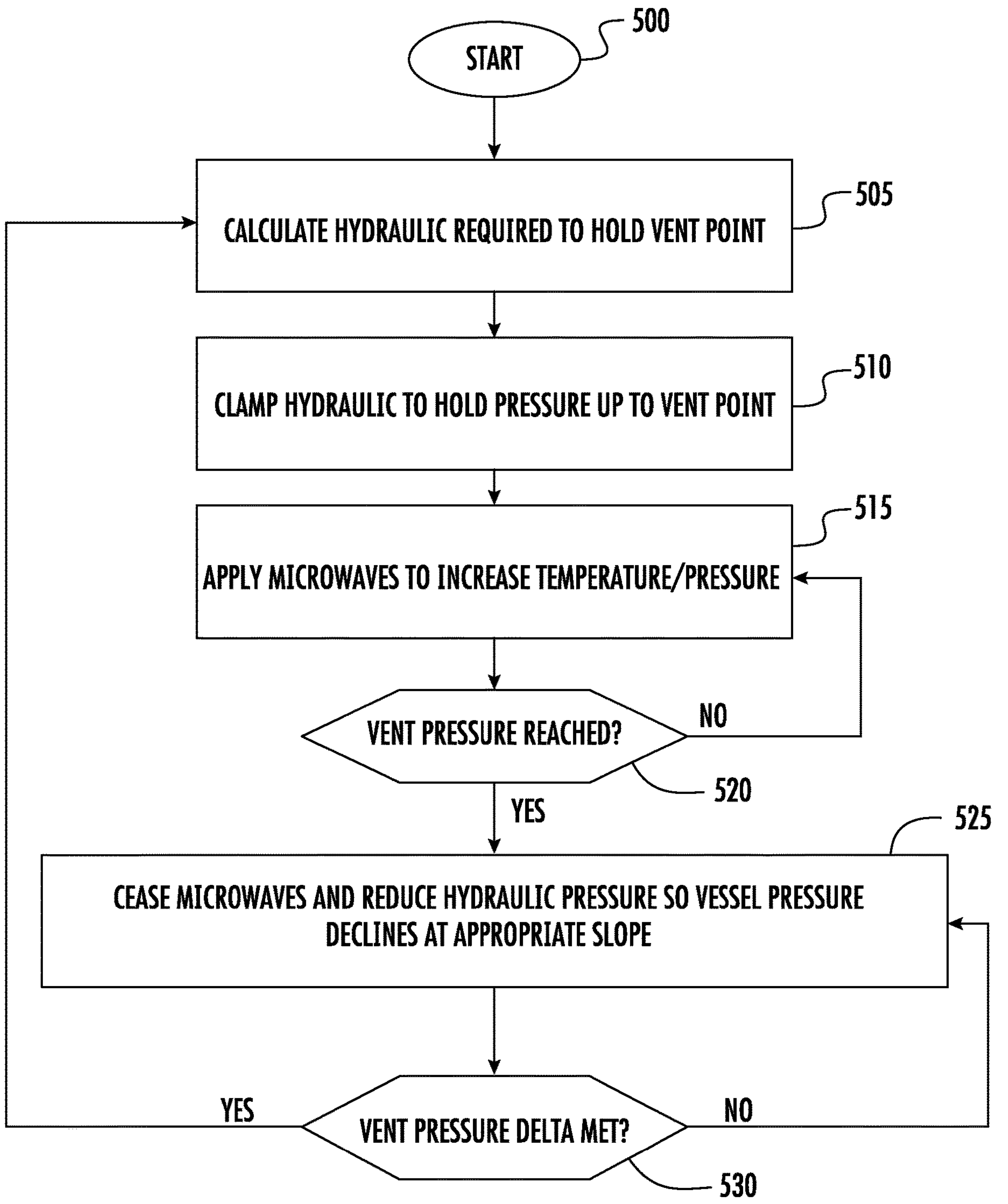
FIG. 23 depicts a flow diagram for a method that can be performed at least partially by a controller of the instrument of FIG. 11, in accordance with an embodiment of this disclosure.

FIG. 23 depicts a flow diagram of an example of a method (schematically represented by blocks 500-530 in FIG. 23) associated with, for example, the exemplary pressure-stepped digestion chemical reaction represented by the chart of FIG. 22 in association with the system schematically depicted in FIG. 1. Referring primarily to FIG. 23 and occasionally to FIG. 1, at block 500, the processor of the controller or computer 30 can provide signals to and receive signals from a graphical user interface of the computer to facilitate a user selecting preprogrammed methods of operation or create custom methods of operation of the instrument 66 (FIGS. 11-15). For example, at block 500, the processor can facilitate programming of at least the following parameters in response to user inputs: sample temperature—sets desired sample peak temperature in the vessel 12; ramp time—sets the time to get from ambient temperature in the vessel to desired sample peak temperature in the vessel; hold time—sets the amount of time to hold the desired sample peak temperature in the vessel; control pressure—sets the maximum desired pressure in the vessel; and vent points—sets the desired number of internal vessel pressure vent points (e.g., the number of the periods of venting).

Processing control is transferred from block 500 to block 505. Blocks 505 through 530 can be generally representative of a do loop or for-loop that is executed or performed in association with each of the periods of venting from the vessel 12 in a serial manner. For example, blocks 505 through 530 can be performed for the first period of venting, followed by blocks 505 through 530 being performed for the second period of venting, and so on.

At block 505, the hydraulic pressure set point is calculated by the processor for a corresponding internal vessel pressure vent point. Reiterating from above, in FIG. 22, a peak of a slash portion (e.g., "/") of the line indicative of hydraulic pressure can be referred to as a hydraulic pressure setpoint, and a peak of a backslash portion (e.g., "\") of the line indicative of vessel internal pressure can be referred to as an internal vessel pressure vent point. The hydraulic pressure setpoint can be based on slope, offset and cushion parameters. The slope parameter can be from an empirically determined curve of the hydraulic pressure necessary to hold a given internal vessel pressure using the clamping apparatus, vessel 12, and cap assembly 14 (e.g., band 57 and lid 58 (e.g., septum)). The offset parameter can be a value used to account for any sealing inefficiencies between vessels 12 and lids 58 due to physical parameters such as, but not limited to, surface finishes and tolerances. The cushion parameter can be an offset that may be added as an extra safety factor that seeks to ensure a robust seal between the lid 58 and vessel 12. Processing control is transferred from block 505 to block 510.

At block 510, the processor causes signal(s) to be sent in a manner that causes the pressure of the fluid in the hydraulic circuit 20 to reach the hydraulic pressure set point. In the present iteration, the hydraulic pressure set point is sufficiently high in a manner that seeks to restrict any premature venting from the vessel 12. In response to the one or more signals at block 510, the motor 16 operates (e.g., in a forward rotational direction), and the master displacement member 36 responsively moves until the hydraulic pressure set point is reached, as indicated by the hydraulic pressure sensor 24. Operation of the motor 16 is ceased in response to the indication that the hydraulic pressure set point is reached. In response to the resulting pressure in the hydraulic circuit 20, the vessel 12 is sealed closed by the lid 58, for example as discussed above. Processing control is transferred from block 510 to block 515.

At block 515, the processor causes signal(s) to be sent in a manner that causes the contents of the vessel 12 to be heated, for example by microwaves from the microwave source 15, as discussed above. In response to the heating, the temperature and pressure increase in the vessel 12. More specifically, the microwaves increase the temperature of the sample in the vessel 12, and the increased pressure in the vessel is a byproduct of the temperature increase of the sample.

Simultaneously with block 515, at block 520 the processor receives signals indicative of the pressure and/or temperature in the vessel 12. For example, the processor can receive signals from both the temperature sensor 28 and the force sensor 26. Reiterating from above, signals from the temperature sensor are indicative of temperature in the vessel 12, and signals from the force sensor 26 are indicative of pressure in the vessel 12. At block 520 a determination is made whether outward venting from the vessel 12 is to be initiated. For example, microwaves (see, e.g., block 515) can continue to be applied to the contents of the vessel 12 to increase the temperature of the sample in the vessel until (i) a temperature set point is reached (after which the system may maintain sample temperature for set hold time) or (ii) internal vessel pressure reaches the desired vent pressure (e.g., the internal vessel pressure vent point). The processor can determine whether the temperature set point is reached based upon signals from the temperature sensor 28. The processor can determine whether the internal vessel pressure vent point (e.g., set point) is reached based upon signals from the force sensor 26. Reiterating from above with reference to FIG. 22, the peak of a backslash portion (e.g., "\") of the line indicative of vessel internal pressure can be referred to as an internal vessel pressure vent point. In response to a positive determination at block 520, processing control is transferred to block 525.

At block 525, signals and/or cessation of signals from the processor cause cessation of operation of the microwave source 15 to discontinue the heating of the vessel contents, and venting from the vessel 12 is initiated. For initiating and controlling the venting from the vessel 12, responsive to one or more signals at block 525 the motor 16 operates in the reverse rotational direction, and the master displacement member 36 responsively moves to reduce pressure in the in the hydraulic circuit 20. In response to feedback signals received by the processor and signals from the processor to the motor 16, the pressure in the hydraulic circuit 20 is reduce in a manner so that pressure in the vessel 12 declines at an appropriate slope (e.g., rate) to control the venting in the manner discussed above (e.g., in a manner that seeks to ensure that only gas from a head space of the vessel is vented (e.g., typically without discharging any of the analyte from the vessel)). For example, the system can reduce internal vessel pressure based on pressure delta and pressure slope parameters. The pressure delta parameter determines or defines the total internal vessel pressure drop. The pressure slope parameter determines or defines the rate at which the system achieves the internal vessel pressure drop. For example, the motor 16 can be operated in reverse, with the motor speed determined or defined by the pressure slope parameter, to reduce the clamping force on the lid 58 while the vessel internal pressure is monitored by way of the force sensor 26 and feed back to, and utilized by, the processor for controlling operations (e.g., adjusting motor speed).

Simultaneously with block 525, at block 530 the processor can determine, based upon signals from the force sensor 26, whether a predetermined reduction in vessel internal pressure has occurred (e.g., with reference to FIG. 22, whether the bottom of the respective backslash portion (e.g., "\") of the line indicative of vessel internal pressure has been reached. When the processor determines based upon signals from the force sensor 26 that the desired vessel internal pressure difference has been met (e.g., determined or defined by a pressure delta parameter), processing control is transferred to bock 505 to initiate the next iteration through blocks 505-530. That said, the sequence through the blocks 505-530 can be arranged differently. For example, the calculations at block 505 may be performed for each iteration (e.g., vent point) before progressing to block 510, so that after block 505 the processor generally loops several times through blocks 510-530. Other variations are within the scope of this disclosure.

At least partially reiterating from above, in one aspect of this disclosure, the pressure inside the vessel 12 and closing force are both at least indirectly measured, and during the venting process the closing force can be adjusted to substantially match (e.g., be slightly less than) the pressure of the contents inside of the vessel. the closing force can be matched, for example, to within about 50 pounds per square inch of the pressure inside the vessel 12, and in some cases matched to within about 10 pounds per square inch of the pressure inside the vessel, or even less.

Partially opening the vessel 12 for venting purposes while the pressures are substantially matched helps avoid the types of sprays, aerosols, or outright liquid ejection that might otherwise occur. Accordingly, in an exemplary method the reaction vessel 12 is opened for venting while the respective pressures are matched within about 50 pounds per square inch, matched within about 10 pounds per square inch, or matched within less than 10 pounds per square inch.

Because the reactions of interest are often digestion reactions, temperature within the vessel 12 is typically maintained above the boiling point of water, sometimes as high as 300-350° C. Similarly, the pressure inside the vessel 12 will typically be at least about 250 pounds per square inch, often above 500 pounds per square inch, and sometimes as high as about or almost 700 to 750 pounds per square inch. In some implementations, the pressure within the vessel is not allowed to exceed 750 pounds per square inch.

At least partially reiterating from above, the system 10 and, thus, the instrument 66 typically includes at least one controller 30 operatively associated with, for example, numerous electrical components of the system (e.g., the microwave source, sensors, motor(s), and/or other suitable components). The at least one controller 30 can include one or more computers, computer data storage devices, programmable logic devices (PLDs) and/or application-specific integrated circuits (ASIC). A suitable computer can include one or more of each of a central processing unit (CPU) or processor, integrated circuits or memory, user interface (e.g., graphical user interface), peripheral or equipment interface for interfacing with other electrical components of the system, and/or any other suitable features. The controller(s) can respectively communicate with electrical components of the system by way of suitable signal communication paths. Processes of this disclosure can be controlled (e.g., at least partially controlled) in response to the execution of computer-based algorithms operatively associated with the at least one controller 30. The controller 30 is schematically represented as a rectangle identified by numeral 30 in FIG. 1, and other components or features mentioned in this paragraph are schematically represented by rectangles positioned within the rectangle identified by numeral 30 in FIG. 1

At least partially reiterating from above, a variety of differently configured clamping apparatuses are within the scope of this disclosure. For example and in an alternative embodiment, it is believed that the hydraulic circuit 20 (FIG. 1) and, optionally, also the spring 88 (FIG. 12) can be eliminated, the upstream linkage 18 (FIG. 1) can be reoriented so that the lead screw 124 (FIG. 16) rotates about an upright axis and the drive nut 126 (FIG. 16) reciprocates along the upright axis, and the extension member 82 (FIG. 12) can be fixedly mounted to the lower end of the drive nut 126 so that the extension member and drive nut reciprocate together. In such an alternative embodiment, the pressure sensor 24 (FIG. 1) may be replaced with a suitably mounted force sensor configured to measure the closing force being provided by the alternative clamping apparatus. Such a force sensor may be a load cell located in series with respective components of the alternative clamping apparatus. Accordingly for this alternatively embodiment, throughout the foregoing the adjustments to hydraulic pressure can be replaced with suitable other (e.g., purely mechanical) adjustments.

To supplement the present disclosure, this application incorporates entirely by reference the following patents: U.S. Pat. Nos. 9,237,608; 9,943,823; and 10,527,530.

Reiterating from above, it is within the scope of this disclosure for one or more of the terms "substantially," "about," "approximately," and/or the like, to qualify each of the adjectives and adverbs of the foregoing disclosure, for the purpose of providing a broad disclosure. As an example, it is believed that those of ordinary skill in the art will readily understand that, in different implementations of the features of this disclosure, reasonably different engineering tolerances, precision, and/or accuracy may be applicable and suitable for obtaining the desired result. Accordingly, it is believed that those of ordinary skill will readily understand usage herein of the terms such as "substantially," "about," "approximately," and the like.

In the specification and drawings, examples of embodiments have been disclosed. The present invention is not limited to such exemplary embodiments. The use of the term "and/or" includes any and all combinations of one or more of the associated listed items. Unless otherwise noted, specific terms have been used in a generic and descriptive sense and not for purposes of limitation.

What is claimed is:

1. A system for performing a digestion reaction; the system comprising:

a support configured to support a reaction vessel;

a clamping apparatus configured to apply a closing force toward a mouth of the reaction vessel while the reaction vessel is supported by the support, wherein:

the clamping apparatus comprises a hydraulic system comprising a displacement member that is at least partially positioned in a chamber, the chamber and the displacement member are cooperatively configured so that the displacement member moves outwardly relative to the chamber in response to increased hydraulic pressure in the hydraulic system, and the clamping apparatus is configured to apply the closing force in response to the displacement member moving outwardly relative to the chamber;

a heating apparatus configured to heat contents of the reaction vessel while the reaction vessel is supported by the support;

a first sensor configured to provide a signal indicative of gas pressure in a headspace of the reaction vessel while the reaction vessel is supported by the support;

a second sensor, wherein the second sensor is a hydraulic pressure sensor configured to provide a signal indicative of hydraulic pressure in the hydraulic system; and a computer configured to control, by way of the clamping apparatus, in response to inputs, the closing force and outward venting from an opening of the reaction vessel while the reaction vessel is supported by the support, wherein the inputs comprise the signal from the first sensor and the signal from the second sensor.

2. The system according to claim 1, wherein:

the clamping apparatus comprises a motor configured to be operated to increase hydraulic pressure in the hydraulic system; and the clamping apparatus is configured to increase the closing force in response to increased hydraulic pressure in the hydraulic system.

3. The system according to claim 1, wherein:

the support comprises a receptacle;

the receptacle comprises a frustoconical inner surface configured to be in opposing face-to-face contact with the reaction vessel;

the frustoconical inner surface has a varying diameter; and the diameter of the frustoconical inner surface increases in an upright direction.

4. The system according to claim 1, comprising at least one spring, wherein the system is configured so that force from the at least one spring urges the displacement member to move inwardly relative to the chamber in response to reduced hydraulic pressure in the hydraulic system.

5. The system according to claim 1, wherein:

the clamping apparatus comprises an engager connected to the displacement member for moving with the displacement member;

the clamping apparatus is configured to clamp a portion of a closure between a lower side of an annular portion of the engager and the mouth of the reaction vessel while the reaction vessel is supported by the support;

the annular portion of the engager extends around a central portion of the engager; and the first sensor is cooperatively associated with the central portion of the engager to provide the signal indicative of gas pressure in the headspace of the reaction vessel while the reaction vessel is supported by the support.

6. The system according to claim 1, wherein the clamping apparatus comprises an engagement part configured to be reciprocated toward and away from the support, and the system comprises:

the reaction vessel; and an elastic septum configured to be clamped between a mouth of the reaction vessel and the engagement part.

7. The system according to claim 6, comprising a band, wherein the band comprises:

a body extending at least partially around and defining a hole; and a plurality of latches extending downwardly from the body and configured to be elastically deformed and releasably engage a predetermined portion of the reaction vessel to releasably mount the band and the septum to the mouth of the reaction vessel.

8. The system according to claim 1, wherein the hydraulic pressure sensor is mounted in an opening to an interior of a hydraulic passageway of the hydraulic system.

9. The system according to claim 8, wherein:

the chamber of the hydraulic system is a cylinder, and the displacement member of the hydraulic system is a piston that is at least partially positioned in the cylinder.

10. The system according to claim 1, comprising a body, wherein:

the chamber of the hydraulic system comprises a hole defined in the body; and the displacement member is mounted for reciprocating in the hole in response to predetermined variations in hydraulic pressure in the hydraulic system.

11. The system according to claim 10, wherein:

the system comprises a sleeve fixedly mounted to the body;

the sleeve comprises an inwardly extending flange; and the system comprises at least one spring positioned between the flange and the displacement member so that force from the at least one spring urges the displacement member to move inwardly relative to the chamber in response to reduced hydraulic pressure in the hydraulic system.

12. The system according to claim 11, wherein:

an end of the at least one spring is engaged against the flange, and another end of the at least one spring is engaged against the displacement member.

13. The system according to claim 10, wherein:

the hole is a first hole;

the hydraulic system comprises a second hole defined in the body; and the second hole is in fluid communication with the first hole.

14. The system according to claim 13, wherein the hydraulic system comprises a displacement member mounted for reciprocating in the second hole in response to operation of a motor.

15. The system according to claim 14, wherein:

the first hole is elongate and defines a lengthwise axis, the second hole is elongate and defines a lengthwise axis, and the lengthwise axis of the first hole extends crosswise to the lengthwise axis of the second hole.

16. A system for performing a digestion reaction; the system comprising:

a support configured to support a reaction vessel;

a clamping apparatus comprising a flexible engagement member, wherein:

the clamping apparatus is configured to clamp at least a portion of a closure between a lower side of the flexible engagement member and a mouth of the reaction vessel while the reaction vessel is supported by the support, the flexible engagement member comprises both a downwardly protruding central portion and a downwardly protruding outer portion extending at least partially around the downwardly protruding central portion, and the lower side of the flexible engagement member defines an upwardly extending recessed cavity that:

extends at least partially around the downwardly protruding central portion of the flexible engagement member, and is positioned between the downwardly protruding central portion of the flexible engagement member and the downwardly protruding outer portion of the flexible engagement member, so that the downwardly protruding outer portion of the flexible engagement member extends at least partially around the upwardly extending recessed cavity that is defined by the lower side of the flexible engagement member; and a force sensor cooperatively associated with the downwardly protruding central portion of the flexible engagement member to provide a signal indicative of pressure in the reaction vessel while at least a portion of the closure is clamped between the lower side of the flexible engagement member and the mouth of the reaction vessel, the system being configured to transfer force to the force sensor by way of at least the central portion of the flexible engagement member, wherein the upwardly extending recessed cavity defined by the flexible engagement member is configured to accommodate upward movement of a portion of the closure in a manner that enhances accuracy of signals from the force sensor.

17. The system according to claim 16, wherein the upwardly extending recessed cavity defined by the flexible engagement member is configured to partially accommodate upward distention of the closure in a manner that enhances accuracy of signals from the force sensor.

18. The system according to claim 16, wherein:

the flexible engagement member is part of an engagement apparatus;

the engagement apparatus further comprises a backing structure configured to force the flexible engagement member toward the mouth of the reaction vessel while the reaction vessel is supported by the support;

the backing structure is more rigid than the flexible engagement member and defines a through hole through which the force sensor is cooperatively associated with the downwardly protruding portion of the flexible engagement member to provide the signal indicative of pressure in the reaction vessel while the portion of the closure is clamped between the lower side of the flexible engagement member and the mouth of the reaction vessel.

19. The system according to claim 16, wherein:

the clamping apparatus comprises a hydraulic system and a motor configured to be operated to increase hydraulic pressure in the hydraulic system; and the clamping apparatus is configured to increase the closing force in response to increased hydraulic pressure in the hydraulic system.

20. The system according to claim 16, wherein:

the support comprises a receptacle;

the receptacle comprises a frustoconical inner surface configured to be in opposing face-to-face contact with the reaction vessel;

the frustoconical inner surface has a varying diameter; and the diameter of the frustoconical inner surface increases in an upright direction.

21. The system according to claim 16, wherein: the clamping apparatus is configured to apply a closing force toward the mouth of the reaction vessel while the reaction vessel is supported by the support; and the system comprises a second sensor configured to provide a signal indicative of the closing force.

22. The system according to claim 16, wherein the upwardly extending recessed cavity is configured, comprising the upwardly extending recessed cavity being downwardly open and empty, so that when the system is operating an outwardly flexing portion of the closure can extend upwardly into the upwardly extending recessed cavity.

23. The system according to claim 16, wherein:

an intermediate portion of the flexible engagement member is positioned between the downwardly protruding central portion of the flexible engagement member and the downwardly protruding outer portion of the flexible engagement member; and the downwardly protruding central portion of the flexible engagement member extends downwardly from the intermediate portion of the flexible engagement member so that:

a lower surface of the intermediate portion of the flexible engagement member at least partially defines the upwardly extending recessed cavity, and an upper surface of the downwardly protruding central portion of the flexible engagement member at least partially defines a downwardly extending recessed cavity.

24. The system according to claim 16, wherein:

the flexible engagement member is an engagement disk of an engagement apparatus;

the engagement apparatus further comprises an annular channel and an annular sleeve;

an inner annular wall of the channel extends downwardly from a periphery of the engagement disk; and the sleeve extends upwardly from an outer annular wall of the channel.

25. The system according to claim 16, wherein the flexible engagement member is a flexible membrane.

26. The system according to claim 16, comprising a linkage positioned between and engaged against each of the force sensor and an upper surface of the downwardly protruding central portion of the flexible engagement member, wherein the linkage is configured to transfer force to the force sensor from the downwardly protruding central portion of the flexible engagement member.

27. The system according to claim 26, wherein:

an intermediate portion of the flexible engagement member is positioned between the downwardly protruding central portion of the flexible engagement member and the downwardly protruding outer portion of the flexible engagement member;

the downwardly protruding central portion of the flexible engagement member extends downwardly from the intermediate portion of the flexible engagement member so that:

a lower surface of the intermediate portion of the flexible engagement member at least partially defines the upwardly extending recessed cavity, and an upper surface of the downwardly protruding central portion of the flexible engagement member at least partially defines a downwardly extending recessed cavity; and a lower end of the linkage extends into the downwardly extending recessed cavity.

* * * * *